(12) United States Patent
Wang et al.

(10) Patent No.: US 8,541,503 B2
(45) Date of Patent: Sep. 24, 2013

(54) POLYMERIC CORE-SHELL NANOPARTICLES WITH INTERPHASE REGION

(75) Inventors: Xiaorong Wang, Hudson, OH (US); Georg Böhm, Akron, OH (US); Sandra Warren, Gradignan (FR); Xiao-Dong Pan, Akron, OH (US); James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 623 days.

(21) Appl. No.: 12/374,883

(22) PCT Filed: Jul. 27, 2007

(86) PCT No.: PCT/US2007/074611
§ 371 (c)(1),
(2), (4) Date: Jun. 5, 2009

(87) PCT Pub. No.: WO2008/014464
PCT Pub. Date: Jan. 31, 2008

(65) Prior Publication Data
US 2010/0004398 A1 Jan. 7, 2010

Related U.S. Application Data

(60) Provisional application No. 60/820,695, filed on Jul. 28, 2006.

(51) Int. Cl.
*C08F 2/04* (2006.01)
*C08F 257/02* (2006.01)
*B32B 1/00* (2006.01)
*B32B 27/14* (2006.01)
*B32B 3/00* (2006.01)

(52) U.S. Cl.
USPC ............................... 525/98; 525/271

(58) Field of Classification Search
USPC ................................. 525/98, 271
See application file for complete search history.

(56) References Cited

U.S. PATENT DOCUMENTS

| | | | |
|---|---|---|---|
| 2,531,396 A | 11/1950 | Carter et al. | |
| 3,177,186 A | 4/1965 | Miller | |
| 3,598,884 A | 8/1971 | Wei et al. | |
| 3,793,402 A | 2/1974 | Owens | |
| 3,840,620 A | 10/1974 | Gallagher | |
| 3,927,143 A | 12/1975 | Makowski et al. | |
| 3,972,963 A | 8/1976 | Schwab et al. | |
| 4,075,186 A | 2/1978 | Ambrose et al. | |
| 4,233,409 A | 11/1980 | Bulkley | |
| 4,247,434 A | 1/1981 | Vanderhoff et al. | |
| 4,248,986 A | 2/1981 | Lai et al. | |
| 4,326,008 A | 4/1982 | Rembaum | |
| 4,386,125 A | 5/1983 | Shiraki et al. | |
| 4,408,018 A | 10/1983 | Bartman et al. | |
| 4,417,029 A | 11/1983 | Milkovich | |
| 4,463,129 A | 7/1984 | Shinada et al. | |
| 4,471,093 A | 9/1984 | Furukawa et al. | |
| 4,543,403 A | 9/1985 | Isayama et al. | |
| 4,598,105 A | 7/1986 | Weber et al. | |
| 4,600,749 A * | 7/1986 | Minekawa et al. | 525/314 |
| 4,602,052 A | 7/1986 | Weber et al. | |
| 4,617,346 A | 10/1986 | Sonoda | |
| 4,659,782 A | 4/1987 | Spinelli | |
| 4,659,790 A | 4/1987 | Shimozato et al. | |
| 4,717,655 A | 1/1988 | Fulwyler | |
| 4,722,770 A | 2/1988 | Blottiere et al. | |
| 4,725,522 A | 2/1988 | Breton et al. | |
| 4,764,572 A | 8/1988 | Bean, Jr. | |
| 4,773,521 A | 9/1988 | Chen | |
| 4,774,189 A | 9/1988 | Schwartz | |
| 4,788,254 A | 11/1988 | Kawakubo et al. | |
| 4,798,691 A | 1/1989 | Kasai et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,861,131 A | 8/1989 | Bois et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |

(Continued)

FOREIGN PATENT DOCUMENTS

| | | | |
|---|---|---|---|
| CA | 2127919 | | 3/1995 |
| CN | 1560094 | | 1/2005 |
| DE | 3735403 | * | 5/1989 |
| DE | 4241538 | | 6/1994 |
| EP | 0143500 | | 6/1985 |
| EP | 0255170 | | 2/1988 |
| EP | 0265142 | | 4/1988 |
| EP | 0322905 | | 7/1989 |
| EP | 0352042 | | 1/1990 |
| EP | 0172344 | | 2/1992 |

(Continued)

OTHER PUBLICATIONS

Brostert et al., electronic translation of DE 3735403, May 1989.*
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).

(Continued)

*Primary Examiner* — Jeffrey Mullis
(74) *Attorney, Agent, or Firm* — Meredith E. Hooker; Nathan T. Lewis

(57) ABSTRACT

A polymeric nanoparticle composition is provided. The nanoparticle may be of a core/shell configuration with an interphase region connecting the core and the shell. The mean average diameter of the polymer nanoparticles may be less than about 250 nm. The size, composition, and/or configuration of the interphase region may be varied to achieve desired physical and/or chemical properties of the resulting polymeric nanoparticles, and of the compositions into which the nanoparticles are compounded.

23 Claims, 19 Drawing Sheets

(56) References Cited

U.S. PATENT DOCUMENTS

| | | |
|---|---|---|
| 4,906,695 A | 3/1990 | Blizzard et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Stayer, Jr. et al. |
| 5,073,498 A | 12/1991 | Schwartz et al. |
| 5,075,377 A | 12/1991 | Kawakubo et al. |
| 5,120,379 A | 6/1992 | Noda et al. |
| 5,130,377 A | 7/1992 | Trepka et al. |
| 5,169,914 A | 12/1992 | Kaszas et al. |
| 5,183,851 A | 2/1993 | Visani et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,534,592 A | 7/1996 | Halasa et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,700,897 A | 12/1997 | Klainer et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,897,811 A | 4/1999 | Lesko |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,506,567 B2 | 1/2003 | Makino et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,067,199 B2 | 6/2006 | Hattori et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,538,159 B2 | 5/2009 | Wang et al. |
| 7,544,740 B2 | 6/2009 | Wang et al. |
| 7,553,909 B2 | 6/2009 | Wang et al. |
| 7,560,510 B2 | 7/2009 | Bohm et al. |
| 7,597,959 B2 | 10/2009 | Wang et al. |
| 7,649,049 B2 | 1/2010 | Kleckner et al. |

| | | |
|---|---|---|
| 7,659,342 B2 | 2/2010 | Wang et al. |
| 7,695,813 B2 | 4/2010 | Schultes et al. |
| 7,718,737 B2 | 5/2010 | Wang et al. |
| 7,718,738 B2 | 5/2010 | Wang et al. |
| 7,786,236 B2 | 8/2010 | Wang et al. |
| 7,795,344 B2 | 9/2010 | Wang et al. |
| 7,820,771 B2 | 10/2010 | Lapra et al. |
| 7,829,624 B2 | 11/2010 | Warren |
| 7,884,160 B2 | 2/2011 | Wang et al. |
| 7,897,690 B2 | 3/2011 | Wang et al. |
| 8,063,142 B2 | 11/2011 | Wang et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heinrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2004/0202881 A1 | 10/2004 | Everaerts et al. |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Wang et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0220750 A1 | 10/2005 | Robert et al. |
| 2005/0220890 A1 | 10/2005 | Charmot et al. |
| 2005/0228072 A1 | 10/2005 | Winkler et al. |
| 2005/0228074 A1 | 10/2005 | Wang et al. |
| 2005/0282956 A1 | 12/2005 | Wang et al. |
| 2005/0288393 A1 | 12/2005 | Lean et al. |
| 2006/0084722 A1 | 4/2006 | Bohm et al. |
| 2006/0116473 A1 | 6/2006 | Castner et al. |
| 2006/0147714 A1* | 7/2006 | Schultes et al. ............... 428/407 |
| 2006/0173115 A1 | 8/2006 | Wang et al. |
| 2006/0173130 A1 | 8/2006 | Wang et al. |
| 2006/0235128 A1 | 10/2006 | Wang et al. |
| 2007/0027264 A1 | 2/2007 | Wang et al. |
| 2007/0081830 A1* | 4/2007 | Bender et al. .................. 399/159 |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0161754 A1 | 7/2007 | Bohm et al. |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0188579 A1 | 8/2008 | Wang et al. |
| 2008/0242813 A1 | 10/2008 | Zheng et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |
| 2009/0270558 A1 | 10/2009 | Gandon-Pain et al. |
| 2009/0306246 A1 | 12/2009 | Gervat et al. |
| 2010/0016472 A1 | 1/2010 | Wang et al. |
| 2010/0016512 A1 | 1/2010 | Wang et al. |
| 2010/0324167 A1 | 12/2010 | Wang et al. |
| 2011/0021702 A1 | 1/2011 | Gandon-pain et al. |
| 2011/0024011 A1 | 2/2011 | Castner et al. |
| 2011/0213066 A1 | 9/2011 | Wang et al. |
| 2011/0236686 A1 | 9/2011 | Kitano et al. |
| 2012/0132346 A1 | 5/2012 | Chen et al. |

FOREIGN PATENT DOCUMENTS

| | | |
|---|---|---|
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 1/2003 |
| EP | 1321489 | 6/2003 |
| EP | 1783168 | 5/2007 |
| JP | 70002106 B | 1/1970 |
| JP | 1279943 | 1/1989 |
| JP | 2191619 | 7/1990 |
| JP | 2196893 | 8/1990 |
| JP | 05132605 | 5/1993 |
| JP | 06-093057 A | 4/1994 |
| JP | 06248017 | 9/1994 |
| JP | 7011043 | 1/1995 |
| JP | 81499062 | 8/1996 |
| JP | 2000514791 | 11/2000 |
| JP | 2003095640 | 4/2003 |
| JP | 2006072283 | 3/2006 |
| JP | 2006106596 | 4/2006 |
| JP | 2007304409 | 11/2007 |
| RU | 2184125 | 6/2002 |
| WO | 9104992 | 7/1991 |
| WO | 9704029 | 2/1997 |
| WO | 9853000 | 11/1998 |
| WO | 0187999 | 11/2000 |
| WO | 0075226 | 12/2000 |
| WO | 0202472 | 1/2002 |
| WO | 0241987 | 5/2002 |
| WO | 0244290 | 6/2002 |
| WO | 02031002 | 7/2002 |
| WO | 02081233 | 10/2002 |
| WO | 02100936 | 12/2002 |
| WO | 03032061 | 4/2003 |
| WO | 03085040 | 10/2003 |
| WO | 03106557 | 12/2003 |
| WO | 2004058874 | 7/2004 |
| WO | 2006069793 | 7/2006 |
| WO | 2008014464 | 1/2008 |
| WO | 2008079276 | 7/2008 |
| WO | 2008079807 | 7/2008 |
| WO | 2009006434 | 1/2009 |

OTHER PUBLICATIONS

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 4 pp. (2006).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday 1, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)—Coated Polystyrene Nanoparticles Prepared by Macromonomer Method", Journal of Polymer Science: Part A: Polymer Chemistry, vol. 37, pp. 2155-2166 (1999).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Coleman, Lester E. et al., "Reaction of Primary Aliphatic Amines with Maleic Anhydride", J. Org,. Chem., 24, 185, pp. 135-136 (1959).

Cosgrove, T. et al., "Adsorbed Block Copolymer of Poly(2-vinylpyridine) and Polystyrene Studied by Neutron Reflectivity and Surface Force Techniques", Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Cui, Honggang et al., "Block Copolymer Assembly via Kinetic Control", Science, vol. 317, pp. 647-650 (Aug. 3, 2007).

Dieterich, W. et al., "Non-Debye Relaxations in Disordered Ionic Solids", Chem. Chys., 284, pp. 439-467 (2002).

Edmonds, William F. et al., "Disk Micelles from Nonionic Coil—Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Gilman, J.W. et al., "Recent Advances in Flame Retardant Polymer Nanocomposites", pp. 273-283.

Giannelis, E.P. "Polymer Layered Silicate Nanocomposites", Advanced Materials, vol. 8, No. 1, pp. 29-35 (Jan. 1, 1996).

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493 (Jan. 17, 1996).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Haeussler, L. et al., "Simultaneous TA and MS Analysis of Alternating Styrene-Malei Anhydride and Styrene-Maleimide Copolymers", Thermochim. Acta, 277, 14 (1996).

Hay, J.N. et al., "A Review of Nanocomposites", 15 pp. (2000).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kralik, M. et al., "Catalysis by metal nanoparticles supported on functional organic polymers", Journal of Molecular Catalysis A: Chemical, vol. 177, pp. 113-138 (2001).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposites", Macromol., 30, pp. 4097-4102 (1997).

Lagaly, Gehard, "Kink-Block and Gauche-Block Structures of Bimolecular Films", Chem. Int. Ed. Engl., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Mandema et al., "Association of Block Copolymers in Selective Solvents, 1 Measurements on Hydrogenated Poly(styrene-isoprene) in Decane and in trans-Decalin", Makromol. Chem. 180, pp. 1521-1538 (1979).

Matsen, M.W., "Phase Behavior of Block Copolymer/Homopolymer Blends", Macromolecules, vol. 28, pp. 5765-5773 (1995).

Matsumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, Martin et al., "Mineralization of Gold in Block Copolymer Micelles", Macromol. Symp., 117, pp. 207-218 (1997).

Mossmer, Stefan et al., "Solution Behavior of Poly(styrene)-block-poly(2-vinylpyridine) Micelles Containing Gold Nanoparticles", Macromolecules, 33, pp. 4791-4798 (2000).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).

O'Reilly, Rachel K. et al., "Cross-linked block copolymer micelles: functional nanostructures of great potential and versatility", Chem. Soc. Rev., vol. 35, pp. 1068-1083 (Oct. 2, 2006).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696 (1985).

Piirma, lrja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746 (Feb. 17, 2000).

Powers, P.O., "Solubility of Polystyrene Fractions in Hydrocarbons", Industrial and Engineering Chemistry, vol. 42, No. 12, pp. 2558-2562 (Dec. 1950).

Price, Colin, "Colloidal Properties of Block Copolymers", Applied Science Publishers Ltd., Chapter 2, pp. 39-80 (1982).

Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polyisoprene...Layered-Silicate Nanocomposites", Macromol., pp. 3739-3746 (2000).

Riess, Gerard et al., "Block Copolymers", Encyclopedia of Polymer Science and Engineering, vol. 2, pp. 324-434 (1985).

Riess, Gerard, "Micellization of block copolymers", Prog. Polym. Sci., vol. 28, pp. 1107-1170 (Jan. 16, 2003).

Saito, Reiko et al., "Core-Shell Type Polymer Microspheres Prepared From Poly(Styrene-b-Methacrylic Acid)-1. Synthesis of Microgel", Eur. Polym. J., vol. 27, No. 10, pp. 1153-1159 (1991).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Saito, Reiko et al., "Arm-number effect of core-shell type polymer microsphere: I. Control of arm-number of microsphere", Polymer, vol. 35, No. 4, pp. 866-871 (1994).

Saito, Reiko et al., "Synthesis of Microspheres with Microphase-Separated Shells", Journal of Polymer Science: Part A: Polymer Chemistry, vol. 38, pp. 2091-2097 (2000).

Sakurai, Ryo et al., "68.2: Color and Flexible Electronic Paper Display using QR-LPD Technology", SID 06 Digest, pp. 1922-1925 (2006).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Tiyapiboonchaiya, C. et la., "Polymer-m-Ionic-Liquid Electrolytes", Micromol. Chem. Phys., 203, pp. 1906-1911 (2002).

Tomalia, Donald A. et al., Dendritic Macromolecules: Synthesis of Starburst Dendrimers Macromolecules, vol. 19, No. 9, pp. 2466-2468 (1986).

Tsitsilianis, Constantinos et al., "Synthesis and characterization of hetero-arm star copolymers", Makromol. Chem. 191, pp. 2319-2328 (1990).

Tuzar et al ., "Anomalous Behaviour of Solutions of Styrene-Butadiene Block Copolymers in Some Solvents", Makromol. Chem. 178, pp. 22743-2746 (1977).

Tuzar, Zdenek et al., "Micelles of Block and Graft Copolymers in Solutions", Surface and Colloid Science, vol. 15, Chapter 1, pp. 1-83 (1993).

Utiyama et al., "Light-Scattering Studies of a Polystyrene-Poly(methyl methacrylate) Two-Blcok Copolymer in Mixed Solvents", Macromolecules, vol. 7, No. 4, pp. 515-520 (Jul.-Aug. 1974).

Vamvakaki, M. et al., "Synthesis of novel block and statistical methacrylate-based ionomers containing acidic, basic or betaine residues", Polymer, vol. 39, No. 11, pp. 2331-2337 (1998).

van der Maarel, J.R.C. et al., "Salt-Induced Contraction of Polyelectrolyte Diblock Copolymer Micelles", Langmuir, vol. 16, No. 19, pp. 7510-7519 (2000).

Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).

Wang, Xiaorong et al., "Chain conformation in two-dimensional dense state", Journal of Chemical Physics, vol. 121, No. 16, pp. 8158-8162 (Oct. 22, 2004).

Wang, Xiaorong et al., "Strain-induced nonlinearity of filled rubbers", Physical Review E 72, 031406, pp. 1-9 (Sep. 20, 2005).

Pre-print article, Wang, Xiaorong et al., "PMSE 392—Manufacture and Commercial Uses of Polymeric Nanoparticles", Division of Polymeric Materials: Science and Engineering (Mar. 2006).

Wang, Xiaorong et al., "Manufacture and Commercial Uses of Polymeric Nanoparticles", Polymeric Materials: Science and Engineering, vol. 94, p. 659 (2006).

Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Under microscopes the poly(styrene/butadiene) nanoparticles", Journal of Electron Microscopy, vol. 56, No. 6, pp. 209-216 (2007).

Wang, Xiaorong et al., "Synthesis, Characterization, and Application of Novel Polymeric Nanoparticles", Macromolecules, 40, pp. 499-508 (2007).

Wang, Xiaorong et al., "Heterogeneity of structural relaxation in a particle-suspension system", EPL, 79, 18001, pp. 1-5 (Jul. 2007).

Wang, Xiaorong et al., "Dispersing hairy nanoparticles in polymer melts", Polmer, vol. 49, pp. 5683-5691 (Nov. 1, 2008).

Webber, Stephen E. et al., "Solvents and Self-Organization of Polymers", NATO ASI Series, Series E: Applied Sciences, vol. 327, pp. 1-509 (1996).

Whitmore, Mark Douglas et al., "Theory of Micelle Formation in Block Copolymer-Homopolymer Blends", Macromolecules, vol. 18, pp. 657-665 (1985).

Wijmans, C.M. et al., "Effect of Free Polymer on the Structure of a Polymer Brush and Interaction between Two Polymer Brushes", Macromolecules, vol. 27, pp. 3238-3248 (1994).

Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).

Wilson, D.J. et al., "Photochemical Stabilization of Block Copolymer Micelles", Eur. Polym. J., vol. 24, No. 7, pp. 617-621 (1988).

Witten, T.A. et al., "Stress Relaxation in the Lamellar Copolymer Mesophase", Macromolecules, vol. 23, pp. 824-829 (1990).

Wooley, Karen L, "From Dendrimers to Knedel-like Structures", Chem. Eur. J., 3, No. 9, pp. 1397-1399 (1997).

Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).

Worsfold, D.J., "Anionic Copolymerization of Styrene with p-Divinylbenzene", Macromolecules, vol. 3, No. 5, pp. 514-517 (Sep.-Oct. 1970).

Zheng, Lei et al., "Polystyrene Nanoparticles with Anionically Polymerized Polybutadiene Brushes", Macromolecules, 37, pp. 9954-9962 (2004).

Zilliox, Jean-Georges et al., "Preparation de Macromolecules a Structure en Etoile, par Copolymerisation Anionique", J. Polymer Sci.: Part C, No. 22, pp. 145-156 (1968).

"Quaternary Ammonium Compounds", Encyclopedia of Chem Tech., 4th Ed., vol. 20, pp. 739-767 (1996).

Vulcanization Agents and Auxiliary Materials, Kirk-Othmer, Encyclopedia of Chemical Technology, 3rd Ed., Wiley Interscience, NY, 1982, vol. 22, pp. 390-403.

Bridgestone Americas 2006 Presentation (14 pp.).

Lipman, Bernard, Mar. 26, 2002 Notice of Allowance from U.S. Appl. No. 09/970,830 (4 pp.).

Kiliman, Leszek B., Feb. 13, 2003 Office from U.S. Appl. No. 10/038,748 (3 pp.).

Kiliman, Leszak B., Aug. 25, 2003 Notice of Allowance from U.S. Appl. No. 10/038,748 (5 pp.).

Harlan, Robert D., Mar. 17, 2004 Restriction/Election Office Action from U.S. Appl. No. 10/223,393 (6 pp.).

Harlan, Robert D., Jun. 22, 2004 Office Action from U.S. Appl. No. 10/223,393 (6 pp.).

Harlan, Robert D., Jan. 3, 2005 Notice of Allowance from U.S. Appl. No. 10/223,393 (6 pp.).

Lipman, Bernard, Mar. 25, 2004 Restriction/Election Office Action from U.S. Appl. No. 10/331,841 (6 pp.).

Lipman, Bernard, Nov. 18, 2004 Notice of Allowance from U.S. Appl. No. 10/331,841 (5 pp.).

Lipman, Bernard, Mar. 24, 2004 Restriction/Election Office Action from U.S. Appl. No. 10/345,498 (5 pp.).

Lipman, Bernard, Nov. 23, 2004 Notice of Allowance from U.S. Appl. No. 10/345,498 (5 pp.).

Choi, Ling Siu, Mar. 24, 2006 Office Action from U.S. Appl. No. 10/755,648 (11 pp.).

Choi, Ling Siu, Dec. 4, 2006 Notice of Allowance from U.S. Appl. No. 10/755,648 (9 pp.).

Asinovsky, Olga, Jun. 20, 2006 Office Action from U.S. Appl. No. 10/791,049 (11 pp.).

Asinovsky, Olga, Dec. 22, 2006 Office Action from U.S. Appl. No. 10/791,049 (11 pp.).

Asinovsky, Olga, Jun. 7, 2007 Office Action from U.S. Appl. No. 10/791,049 (11 pp.).

Asinovsky, Olga, Aug. 16, 2007 Advisory Action from U.S. Appl. No. 10/791,049 (2 pp.).

Asinovsky, Olga, Nov. 28, 2007 Office Action from U.S. Appl. No. 10/791,049 (9 pp.).

Asinovsky, Olga, May 21, 2008 Office Action from U.S. Appl. No. 10/791,049 (11 pp.).

Asinovsky, Olga, Jul. 29, 2008 Advisory Action from U.S. Appl. No. 10/791,049 (3 pp.).

Asinovsky, Olga, Sep. 11, 2008 Office Action from U.S. Appl. No. 10/791,049 (12 pp.).

Mullis, Jeffrey C., Mar. 11, 2009 Office Action from U.S. Appl. No. 10/791,049 (9 pp.).

Mullis, Jeffrey C., May 19, 2009 Advisory Action from U.S. Appl. No. 10/791,049 (5 pp.).

Mullis, Jeffrey C., Mar. 30, 2011 Decision on Appeal from U.S. Appl. No. 10/791,049 [7 pp.].

Ronesi, Vickey M., Jan. 8, 2007 Office Action from U.S. Appl. No. 10/791,177 (5 pp.).

Harlan, Robert D., May 3, 2007 Office Action from U.S. Appl. No. 10/791,177 (6 pp.).

Harlan, Robert D., Oct. 18, 2007 Office Action from U.S. Appl. No. 10/791,177 (6 pp.).

Harlan, Robert D., Jan. 9, 2008 Advisory Action from U.S. Appl. No. 10/791,177 (3 pp.).

Harlan, Robert D., Mar. 7, 2008 Advisory Action from U.S. Appl. No. 10/791,177 (3 pp.).
Harlan, Robert D., May 28, 2008 Office Action from U.S. Appl. No. 10/791,177 (8 pp.).
Harlan, Robert D., Dec. 10, 2008 Final Office Action from U.S. Appl. No. 10/791,177 (8 pp.).
Harlan, Robert D., Mar. 11, 2009 Notice of Allowance from U.S. Appl. No. 10/791,177 (8 pp.).
Harlan, Robert D., Dec. 29, 2009 Notice of Allowance from U.S. Appl. No. 10/791,177 (6 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Le, Hoa T., Apr. 10, 2006 Notice of Allowance from U.S. Appl. No. 10/791,491 (5 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszek B., May 15, 2007 Advisory Action from U.S. Appl. No. 10/817,995 (2 pp.).
Kiliman, Leszak B., Apr. 2, 2008 Notice of Allowance from U.S. Appl. No. 10/817,995 (5 pp.).
Kiliman, Leszek B., Sep. 5, 2008 Office Action from U.S. Appl. No. 10/817,995 (5 pp.).
Kiliman, Leszek B., Mar. 19, 2009 Office Action from U.S. Appl. No. 10/817,995 (5 pp.).
Kiliman, Leszek B., Nov. 13, 2009 Office Action from U.S. Appl. No. 10/817,995 (6 pp.).
Ducheneaux, Frank D., Jun. 8, 2010 Office Action from U.S. Appl. No. 10/817,995 [19 pp.].
Ducheneaux, Frank D., Dec. 28, 2010 Final Office Action from U.S. Appl. No. 10/817,995 [24 pp.].
Ducheneaux, Frank D., Apr. 4, 2011 Advisory Action from U.S. Appl. No. 10/817,995 [6 pp.].
Wyrozebski Lee, Katarzyna I., Dec. 19, 2006 Office Action from U.S. Appl. No. 10/872,731 (6 pp.).
Wyrozebski Lee, Katarzyna I., Mar. 7, 2007 Office Action from U.S. Appl. No. 10/872,731 (13 pp.).
Wyrozebski Lee, Katarzyna I., Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Chevalier, Alicia Ann, Nov. 25, 2009 Office Action from U.S. Appl. No. 10/886,283 (7 pp.).
Chevalier, Alicia Ann, May 3, 2010 Final Office Action from U.S. Appl. No. 10/886,283 (8 pp.).
Chevalier, Alicia Ann, Jul. 8, 2010 Advisory Action from U.S. Appl. No. 10/886,283 [3 pp.].
Chevalier, Alicia Ann, Nov. 23, 2010 Office Action from U.S. Appl. No. 10/886,283 [6 pp.].
Rosenberg, Nancy D., Apr. 12, 2011 Notice of Allowance from U.S. Appl. No. 10/886,283 [4 pp.].
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Mullis, Jeffrey C., Nov. 5, 2008 Advisory Action from U.S. Appl. No. 11/050,115 (4 pp.).
Mullis, Jeffrey C., Feb. 25, 2009 Office Action from U.S. Appl. No. 11/050,115 (8 pp.).
Mullis, Jeffrey C., Sep. 21, 2009 Notice of Allowance from U.S. Appl. No. 11/050,115 (4 pp.).
Mullis, Jeffrey C., Dec. 18, 2009 Supplemental Notice of Allowability from U.S. Appl. No. 11/050,115 (2 pp.).
Lipman, Bernard., Sep. 29, 2006 Office Action from U.S. Appl. No. 11/058,156 (5 pp.).
Lipman, Bernard, May 21, 2007 Notice of Allowance from U.S. Appl. No. 11/058,156 (3 pp.).
Lipman, Bernard, Aug. 28, 2007 Notice of Allowance from U.S. Appl. No. 11/058,156 (5 pp.).
Lipman, Bernard, Feb. 28, 2008 Notice of Allowance from U.S. Appl. No. 11/058,156 (5 pp.).
Lipman, Bernard, May 29, 2008 Notice of Allowance from U.S. Appl. No. 11/058,156 (5 pp.).
Lipman, Bernard, Jan. 14, 2009 Notice of Allowance from U.S. Appl. No. 11/058,156 (5 pp.).
Lipman, Bernard, Oct. 3, 2006 Notice of Allowance from U.S. Appl. No. 11/064,234 (5 pp.).
Raza, Saira B., Oct. 20, 2005 Office Action from U.S. Appl. No. 11/104,759 (12 pp.).
Raza, Saira B., Aug. 21, 2006 Final Office Action from U.S. Appl. No. 11/104,759 (14 pp.).
Haider, Saira Bano, Dec. 22, 2006 Advisory Action from U.S. Appl. No. 11/104,759 (3 pp.).
Haider, Saira Bano, May 16, 2007 Office Action from U.S. Appl. No. 11/104,759 (9 pp.).
Haider, Saira Bano, Oct. 30, 2007 Final Office Action from U.S. Appl. No. 11/104,759 (11 pp.).
Haider, Saira Bano, Mar. 19, 2008 Advisory Action from U.S. Appl. No. 11/104,759 (3 pp.).
Haider, Saira Bano, Jun. 12, 2008 Office Action from U.S. Appl. No. 11/104,759 (10 pp.).
Haider, Saira Bano, Dec. 2, 2008 Office Action from U.S. Appl. No. 11/104,759 (10 pp.).
Haider, Saira Bano, Mar. 3, 2009 Advisory Action from U.S. Appl. No. 11/104,759 (3 pp.).
Haider, Saira Bano, Sep. 11, 2009 Examiner's Answer from U.S. Appl. No. 11/104,759 (9 pp.).
Haider, Saira Bano, Feb. 9, 2011 Decision on Appeal from U.S. Appl. No. 11/104,759 [4 pp.].
Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Harlan, Robert D., Jan. 9, 2009 Office Action from U.S. Appl. No. 11/117,981 (6 pp.).
Harlan, Robert D., Apr. 30, 2009 Office Action from U.S. Appl. No. 11/117,981 (7 pp.).
Harlan, Robert D., Sep. 29, 2009 Final Office Action from U.S. Appl. No. 11/117,981 (6 pp.).
Harlan, Robert D., Dec. 4, 2009 Notice of Allowance from U.S. Appl. No. 11/117,981 (5 pp.).
Lipman, Bernard, Sep. 14, 2006 Office Action from U.S. Appl. No. 11/168,297 (4 pp.).
Lipman, Bernard, Mar. 2, 2007 Notice of Allowance from U.S. Appl. No. 11/168,297 (3 pp.).
Lipman, Bernard, Apr. 18, 2007 Supplemental Notice of Allowability from U.S. Appl. No. 11/168,297 (3 pp.).
Maksymonko, John M., Feb. 20, 2008 Office Action from U.S. Appl. No. 11/305,279 (14 pp.).
Maksymonko, John M., Aug. 6, 2008 Office Action from U.S. Appl. No. 11/305,279 (11 pp.).
Zemel, Irina Sopja, Jan. 22, 2009 Advisory Action from U.S. Appl. No. 11/305,279 (2 pp.).

Zemel, Irina Sopja, May 28, 2009 Office Action from U.S. Appl. No. 11/305,279 (7 pp.).

Zemel, Irina Sopja, Dec. 3, 2009 Final Office Action from U.S. Appl. No. 11/305,279 (10 pp.).

Maksymonko, John M., Jul. 17, 2008 Office Action from U.S. Appl. No. 11/305,281 (13 pp.).

Lipman, Bernard, Jan. 28, 2009 Notice of Allowance from U.S. Appl. No. 11/305,281 (5 pp.).

Le, Hoa T., Sep. 25, 2008 Office Action from U.S. Appl. No. 11/612,554 (8 pp.).

Le, Hoa T., May 14, 2009 Notice of Allowance from U.S. Appl. No. 11/612,554 (4 pp.).

Maksymonko, John M., Jun. 13, 2008 Office Action from U.S. Appl. No. 11/641,514 (7 pp.).

Mullis, Jeffrey C., Oct. 31, 2008 Office Action from U.S. Appl. No. 11/641,514 (10 pp.).

Mullis, Jeffrey C., Apr. 30, 2009 Final Office Action from U.S. Appl. No. 11/641,514 (11 pp.).

Mullis, Jeffrey C., Jul. 15, 2009 Advisory Action from U.S. Appl. No. 11/641,514 (4 pp.).

Mullis, Jeffrey C., Nov. 9, 2009 Office Action from U.S. Appl. No. 11/641,514 (9 pp.).

Mullis, Jeffrey C., May 26, 2010 Final Office Action from U.S. Appl. No. 11/641,514 [8 pp.].

Mullis, Jeffrey C., Aug. 12, 2010 Advisory Action from U.S. Appl. No. 11/641,514 [4 pp.].

Mullis, Jeffrey C., Oct. 8, 2010 Notice of Allowance from U.S. Appl. No. 11/641,514 [2 pp.].

Maksymonko, John M., Jun. 11, 2008 Office Action from U.S. Appl. No. 11/642,124 (16 pp.).

Cain, Edward J., Dec. 31, 2008 Notice of Allowance from U.S. Appl. No. 11/642,124 (5 pp.).

Cain, Edward J., Mar. 31, 2009 Notice of Allowance from U.S. Appl. No. 11/642,124 (5 pp.).

Maksymonko, John M., May 30, 2008 Office Action from U.S. Appl. No. 11/642,795 (12 pp.).

Cain, Edward J., Dec. 9, 2008 Final Office Action from U.S. Appl. No. 11/642,795 (6 pp.).

Cain, Edward J., Feb. 23, 2009 Notice of Allowance from U.S. Appl. No. 11/642,795 (5 pp.).

Wheeler, Thurman Michael, Oct. 14, 2009 Restriction/Election Office Action from U.S. Appl. No. 11/642,796 (8 pp.).

Wheeler, Thurman Michael, Feb. 8, 2010 Office Action from U.S. Appl. No. 11/642,796 (13 pp.).

Wheeler, Thurman Michael, Jul. 30, 2010 Final Office Action from U.S. Appl. No. 11/642,796 [15 pp.].

Maksymonko, John M., May 28, 2008 Office Action from U.S. Appl. No. 11/642,802 (10 pp.).

Mulcahy, Peter D., Dec. 11, 2008 Restriction/Election Office Action from U.S. Appl. No. 11/642,802 (7 pp.).

Mulcahy, Peter D., May 13, 2009 Office Action from U.S. Appl. No. 11/642,802 (7 pp.).

Mulcahy, Peter D., Nov. 9, 2009 Final Office Action from U.S. Appl. No. 11/642,802 (6 pp.).

Peets, Monique R., May 11, 2009 Restriction/Election Office Action from U.S. Appl. No. 11/697,801 (6 pp.).

Peets, Monique R., Jul. 20, 2009 Office Action from U.S. Appl. No. 11/697,801 (9 pp.).

Peets, Monique R., Jan. 5, 2010 Final Office Action from U.S. Appl. No. 11/697,801 (9 pp.).

Peets, Monique R., Apr. 15, 2010 Notice of Allowance from U.S. Appl. No. 11/697,801 (5 pp.).

Lipman, Bernard, Mar. 20, 2008 Office Action from U.S. Appl. No. 11/764,607 (4 pp.).

Lipman, Bernard, Sep. 25, 2008 Notice of Allowance from U.S. Appl. No. 11/764,607 (3 pp.).

Lipman, Bernard, Jan. 27, 2009 Notice of Allowance from U.S. Appl. No. 11/764,607 (4 pp.).

Mullis, Jeffrey C., Mar. 3, 2010 Restriction/Election Office Action from U.S. Appl. No. 11/771,659 (7 pp.).

Sykes, Altrev C., Mar. 20, 2009 Office Action from U.S. Appl. No. 11/818,023 (27 pp.).

Sykes, Altrev C., Oct. 16, 2009 Office Action from U.S. Appl. No. 11/818,023 (20 pp.).

Sykes, Altrev C., Apr. 5, 2010 Final Office Action from U.S. Appl. No. 11/818,023 (24 pp.).

Sykes, Altrev C., Oct. 29, 2010 Examiner's Answer from U.S. Appl. No. 11/818,023 [24 pp.].

Pak, Hannah J., Apr. 2, 2009 Office Action from U.S. Appl. No. 11/941,128 (9 pp.).

Pak, Hannah J., Jan. 6, 2010 Final Office Action from U.S. Appl. No. 11/941,128 (10 pp.).

Pak, Hannah J., Apr. 30, 2010 Notice of Allowance from U.S. Appl. No. 11/941,128 (11 pp.).

Egwim, Kelechi Chidi, Sep. 30, 2010 Office Action from U.S. Appl. No. 12/047,896 [6 pp.].

Egwim, Kelechi Chidi, Mar. 21, 2011 Final Office Action from U.S. Appl. No. 12/047,896 [6 pp.].

Harlan, Robert D., Dec. 28, 2009 Office Action from U.S. Appl. No. 12/504,255 (6 pp.).

Harlan, Robert D., May 13, 2010 Final Office Action from U.S. Appl. No. 12/504,255 (7 pp.).

Harlan, Robert D., Jun. 9, 2010 Office Action from U.S. Appl. No. 12/504,255 [6 pp.].

Harlan, Robert D., Dec. 1, 2010 Notice of Allowance from U.S. Appl. No. 12/504,255 [6 pp.].

Chen, Jizhuang, Dec. 30, 2005 Office Action from Chinese Patent Application No. 02819527.2 (9 pp.).

Chen, Jizhuang, Dec. 21, 2007 Office Action from Chinese Patent Application No. 02819527.2 (12 pp.).

Chen, Jizhuang, Sep. 26, 2008 Office Action from Chinese Patent Application No. 02819527.2 (4 pp.).

Zhang, Qian, Feb. 10, 2011 Office Action from Chinese Patent Application No. 200780036040.X with English translation (12 pp.).

Schutte, M., Aug. 8, 2006 Office Action from European Patent Application No. 02807196.7 (5 pp.).

Schutte, Maya, Sep. 3, 2007 Office Action from European Patent Application No. 02807196.7 (2 pp.).

Russell, Graham, Nov. 4, 2008 Office Action from European Patent Application No. 05742316.2 (2 pp.).

Mensah, Laure, Dec. 15, 2009 Extended European Search Report from European Patent Application No. 07813483.0 (4 pp.).

Mensah, Laure, Sep. 20, 2010 Office Action from European Patent Application No. 07813483.0 [4 pp.].

Watanabe, Y., May 7, 2008 Office Action from Japanese Patent Application No. 582224/2003 (5 pp.).

Watanabe, Y., Jul. 29, 2008 Office Action from Japanese Patent Application No. 582224/2003 (17 pp.).

Schutte, M., Nov. 13, 2003 International Search Report from PCT Patent Application No. PCT/US02/31817 (3 pp.).

Schutte, M., May 28, 2004 International Search Report from PCT Patent Application No. PCT/US03/40375 (3 pp.).

Iraegui Retolaza, E., Jul. 9, 2004 International Search Report from PCT Patent Application No. PCT/US2004/001000 (3 pp.).

Russell, G., Aug. 1, 2005 International Search Report from PCT Patent Application No. PCT/US2005/010352 (3 pp.).

Johnson, Edward M., Dec. 12, 2008 International Search Report from PCT Application No. PCT/US07/74611 (5 pp.).

Iraegui Retolaza, E., May 30, 2008 International Search Report from PCT Patent Application No. PCT/US2007/026031 (4 pp.).

Cussac, Yolaine, Jun. 24, 2009 International Preliminary Report on Patentability from PCT Patent Application No. PCT/US2007/026031 (7 pp.).

Mettler, Rolf-Martin, May 27, 2008 International Search Report from PCT Patent Application No. PCT/US2007/087869 (4 pp.).

Hammon, Andrew, Aug. 25, 2008 International Search Report from PCT Patent Application No. PCT/US2008/068838 (4 pp.).

Wang, Xiaorong et al., U.S. Appl. No. 10/791,049, filed Mar. 2, 2004 entitled "Method of Making Nano-Particles of Selected Size Distribution".

Wang, Xiaorong et al., U.S. Appl. No. 10/791,177, filed Mar. 2, 2004 entitled "Rubber Composition Containing Functionalized Polymer Nanoparticles".

Wang, Xiaorong et al., U.S. Appl. No, 10/872,731, filed Jun. 21, 2004 entitled "Reversible Polymer/Metal Nano-Composites and Method for Manufacturing Same".

Wang, Xiaorong et al., U.S. Appl. No. 10/886,283, filed Jul. 6, 2004 entitled "Hydropobic Surfaces with Nanoparticles".

Wang, Xiaorong et al., U.S. Appl. No. 11/058,156, filed Feb. 15, 2005 entitled "Multi-Layer Nano-Particle Preparation and Applications".

Wang, Xiaorong et al., U.S. Appl. No. 11/104,759, filed Apr. 13, 2005 entitled "Nano-Particle Preparation and Applications".

Bohm, Georg G.A. et al., U.S. Appl. No. 11/117,981, filed Apr. 29, 2005 entitled "Self Assembly of Molecules to Form Nano-Particle".

Wang, Xiaorong et al., U.S. Appl. No. 11/305,279, filed Dec. 16, 2005 entitled "Combined Use of Liquid Polymer and Polymeric Nanoparticles for Rubber Applications".

Wang, Xiaorong et al., U.S. Appl. No. 11/344,861, filed Feb. 1, 2006 entitled "Nano-Composite and Compositions Therefrom".

Wang, Xiaorong et al., U.S. Appl. No. 11/642,796, filed Dec. 20, 2006 entitled "Hollow Nano-Particles and Method Thereof".

Wang, Xiaorong et al., U.S. Appl. No. 11/764,607, filed Jun. 18, 2007 entitled "Multi-Layer Nano-Particle Preparation and Applications".

Warren, Sandra, U.S. Appl. No. 11/771,659, filed Jun. 29, 2007 entitled "One-Pot Synthesis of Nanoparticles and Liquid Polymer for Rubber Applications".

Wang, Xiaorong et al., U.S. Appl. No. 11/941,128, filed Nov. 16, 2007 entitled "Nano-Particle Preparation and Applications".

Wang, Xiaorong et al., U.S. Appl. No. 11/954,268, filed Dec. 12, 2007 entitled "Nanoporous Polymeric Material and Preparation Method".

Wang, Xiaorong et al., U.S. Appl. No. 12/047,896, filed Mar. 13, 2008 entitled "Reversible Polymer/Metal Nano-Composites and Method for Manufacturing Same".

Wang, Xiaorong et al., U.S. Appl. No. 12/184,895, filed Aug. 1, 2008 entitled "Disk-Like Nanoparticles".

Brovkina, T.A., English translation of May 4, 2011 Office Action from Russian Patent Application No. 2009107218 (7 pp.).

Mullis, Jeffrey C., May 23, 2011 Office Action from U.S. Appl. No. 12/288,174 (6 pp.).

Egwim, Kelechi Chidi, Jun. 13, 2011 Advisory Action from U.S. Appl. No. 12/047,896 (2 pp.).

Xia, Lanying, Jul. 6, 2011 Office Action with English translation from Chinese Patent Application No. 200780047895.2 [8 pp.].

Berger, Sebastian et al., "Stimuli-Responsive Bicomponent Polymer Janus Particles by 'Grafting from'/ 'Grafting to' Approaches," Macromolecules, 41, pp. 9669-9676 (2008).

Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).

Dendukuri, Dhananjay et al., "Synthesis and Self-Assembly of Amphiphilic Polymeric Microparticles," Langmuir, 23, pp. 4669-4674 (2007).

Robertson, C.G. et al., "Effect of structural arrest on Poisson's ratio in nanoreinforced elastomers," Physical Review E, vol. 75, pp. 051403-1 thru 051403-7 (2007).

Schacher, Felix et al., "Multicompartment Core Micelles of Triblock Terpolymers in Organic Media," Macromolecules, 42, pp. 3540-3548 (2009).

Tsitsilianis, Constantinos, "Phase Behavior of Heteroarm Star Copolymers by Differential Scanning Calorimetry," Macromolecules, 26, pp. 2977-2980 (1993).

Walther, Andreas et al., "Engineering Nanostructured Polymer Blends with Controlled Nanoparticle Location using Janus Particles," ACS Nano., 2(6), pp. 1167-1178 (2008).

Walther, Andreas et al., "Janus Particles," Soft Matter, 4, pp. 663-668 (2008).

Wang, Y. et al., "Janus-Like Polymer Particles Prepared Via Internal Phase Separation from Emulsified Polymer/Oil Droplets," Polymer, vol. 50, No. 14, pp. 3361-3369 (2009).

Zhang, Jian et al., "Bioconjugated Janus Particles Prepared by in Situ Click Chemistry," Chemistry of Materials, 21, pp. 4012-4018 (2009).

Zhao, Bin et al., "Mixed Polymer Brush-Grafted Particles: A New Class of Environmentally Responsive Nanostructured Materials," Macromolecules, 42, pp. 9369-9383 (2009).

Mullis, Jeffrey C., Feb. 9, 2011 Restriction/Election Office Action from U.S. Appl. No. 12/288,174 (8 pp.).

Wheeler, Thurman Michael, May 31, 2011 Office Action from U.S. Appl. No. 11/642,796 (12 pp.).

Brovkina, T.A., Oct. 12, 2011 Office Action from Russian Patent Application No. 2009107218 with English translation (8 pp.).

Nov. 3, 2011 Office Action with English translation from Chinese Patent Application No. 200780036040.X (12 pp.).

Mulcahy, Peter D., Nov. 9, 2011 Office Action from U.S. Appl. No. 11/642,802 (6 pp.).

Mullis, Jeffrey C., Nov. 14, 2011 Office Action from U.S. Appl. No. 12/666,146 (6 pp.).

Fink, Brieann R., Dec. 1, 2011 Office Action from U.S. Appl. No. 12/754,367 (15 pp.).

Egwim, Kelechi Chidi, Dec. 2, 2011 Office Action from U.S. Appl. No. 12/047,896 (5 pp.).

Zemei, Irina Sopja, Apr. 30, 2012 Decision on Appeal from U.S. Appl. No. 11/305,279 (12 pp.).

Wang, Chun Cheng, May 4, 2012 Office Action from U.S. Appl. No. 12/555,183 (9 pp.).

Hoffer, Thomas, May 22, 2012 Supplementary European Search Report with Search Opinion from European Patent Application No. 09837105.7 (5 pp.).

Watanabe, Yoko, May 22, 2012 Office Action with English translation from Japanese Patent Application No. 2008-248866 (5 pp.).

Malashkova, B.S., Jun. 1, 2012 Office Action with English translation from Russian Patent Application No. 2010102943 (10 pp.).

Fink, Brieann R., Jun. 6, 2012 Final Office Action from U.S. Appl. No. 12/754,367 (13 pp.).

Adams, Donald E. et al., Jun. 18, 2012 Decision on Appeal from U.S. Appl. No. 11/818,023 (13 pp.).

Kaucher, Mark S., Nov. 5, 2012 Office Action from U.S. Appl. No. 12/979,732 (24 pp.).

Wheeler, Thurman Michael, Nov. 6, 2012 Office Action from U.S. Appl. No. 11/642,796 (14 pp.).

Sykes, Altrev C., Nov. 8, 2012 Final Office Action from U.S. Appl. No. 11/818,023 (20 pp.).

Mulcahy, Peter D., Dec. 6, 2012 Final Office Action from U.S. Appl. No. 11/642,802 (7 pp.).

Author: The Dow Chemical Company, "DVB Cross-link a variety of materials for improved thermal, physical, and chemical properties," 44 pp. (Jan. 2003).

Nakamura, Eiji, Mar. 26, 2013 Office Action with English translation from Japanese Application No. 2009-522021 (9 pp.).

Peets, Monique R., Apr. 11, 2013 Office Action from U.S. Appl. No. 12/979,719 (6 pp.).

* cited by examiner

POLYMERIC CORE-SHELL NANOPARTICLES WITH INTERPHASE REGION

RELATED APPLICATION

This International PCT application claims priority to U.S. Provisional Patent Application No. 60/820,695 filed Jul. 28, 2006, which is incorporated by reference herein in its entirety.

DESCRIPTION OF THE INVENTION

1. Field of the Invention

Disclosed herein are polymeric nanoparticles, methods for their preparation, and their use as, for example, additives for rubber, including natural and synthetic elastomers. For example, the polymeric nanoparticles may comprise a core region and a shell region separated by an interphase region.

2. Background of the Invention

Polymeric nanoparticles have attracted increased attention over the past several years in a variety of fields including catalysis, combinatorial chemistry, protein supports, magnets, and photonic crystals. Similarly, vinyl aromatic (e.g., polystyrene) microparticles have been prepared for uses as a reference standard in the calibration of various instruments, in medical research, and in medical diagnostic tests.

Nanoparticles can be discrete particles uniformly dispersed throughout a host composition. Nanoparticles may be monodisperse in size and uniform in shape. However, controlling the size of nanoparticles during polymerization, the surface characteristics, and/or the internal composition of such nanoparticles can be difficult. Moreover, achieving better control over the surface composition and/or the internal composition of polymeric nanoparticles also is desirable.

Rubbers may be modified by the addition of various polymer compositions. Such polymeric additives often improve the physical properties of rubber compositions. Specifically, moldability and tenacity are often improved through such modifications.

Development of nanoparticles having, in part, a poly(conjugated diene) surface layer that would be compatible with a wide variety of rubbers may be desirable because discrete particles could likely disperse evenly throughout the rubber to provide a uniform rubber composition.

SUMMARY OF THE INVENTION

A polymeric nanoparticle is provided herein. In one embodiment, the nanoparticle may be of a core/shell configuration with an interphase region connecting the core and the shell. In one embodiment, the mean average diameter of the polymeric nanoparticles is less than about 250 nm. The size, composition, and/or configuration of the interphase region may be varied to achieve desired physical and/or chemical properties of the resulting polymeric nanoparticles, and of the compositions into which the nanoparticles are compounded.

A method for forming polymeric nanoparticles may include self-assembly of a plurality of polymer chains into one or more nanoparticles. A rubber composition may be formed, wherein the above-described nanoparticles are combined with at least one rubber to form a modified rubber composition possessing at least one of improved tensile and tear strength.

Herein throughout, unless specifically stated otherwise, "vinyl-substituted aromatic hydrocarbon" and "alkenylbenzene" are used interchangeably. Moreover, "rubber" refers to rubber compounds, including natural rubber, and synthetic elastomers, including styrene-butadiene rubber and ethylene propylene rubber, which are known in the art.

DETAILED DESCRIPTION OF THE INVENTION

Figure 1A:
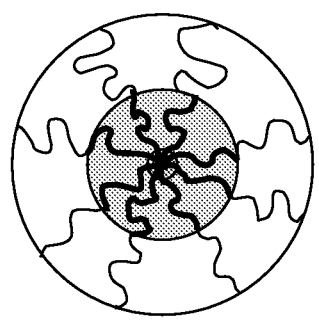
FIG. 1a is one embodiment of a nanoparticle of the present invention in spherical shape.

It is to be understood that both the foregoing and the following descriptions are exemplary and explanatory only and are not restrictive of the invention, as claimed. Combinations and variants of the individual embodiments discussed are both fully envisioned and intended. As used herein, "at least one" means one or more. The section headings used herein are provided for the convenience of the reader and are not meant to limit the scope of the disclosure or the invention, as claimed.

Structure of Nanoparticles

A core/shell configuration refers generally to a polymeric nanoparticle with at least two defined regions, in which one region (called herein the core) is substantially surrounded by another region (called herein the shell). The core region and the shell region may each have one or more layers.

The polymeric nanoparticles comprise at least one interphase region that separates and connects two regions of the polymeric nanoparticles. In one embodiment, an interphase region separates and connects a core region and a shell region. The size, composition, and/or configuration of the interphase region may be varied to achieve desired physical and/or chemical properties of the resulting polymeric nanoparticles, and of the compositions into which the nanoparticles are compounded. In one embodiment, the at least one interphase region separates regions of the polymeric nanoparticles with a difference in at least one physical property. In another embodiment, the at least one interphase region separates regions of the polymeric nanoparticles with a difference in at least one chemical property. In a further embodiment, an at least one interphase region has different physical and/or chemical properties than at least one region to which it is connected. Physical properties of the polymeric nanoparticle regions may include, for example, size, glass transition temperature, hardness or rigidity, elastomeric properties, and crosslink density. Chemical properties of the polymeric nanoparticle regions may include, for example, solubility, polarity, monomer composition, and monomer configuration. The interphase region may have one or more layers.

The size of the polymeric nanoparticles may be measured by their mean average diameters. The core, shell, and at least one interphase region of the polymeric nanoparticle each have a size according to each region's contribution to the mean average diameter. The size of an interphase region, as used herein, is the distance between the two regions separated and connected by the at least one interphase region. An interphase region may have various sizes. In one embodiment, an interphase region may be of a size equal to or smaller than at least one other region of the polymeric nanoparticle. An interphase region may be described as "sharp," "narrow," or "thin" in such an embodiment. In another embodiment, an interphase region may be of a size equal to or greater than at least one other region of the polymeric nanoparticle. The interphase region may be described as "wide" or "thick" in such an embodiment. In a further embodiment, an interphase region is greater in size than at least one of the core and the shell. In yet another embodiment, an interphase region is smaller in size than at least one of the core and the shell. In yet a further embodiment, an interphase region is smaller in size than both the core and the shell. In still another embodiment, the interphase region is greater than about 1 nanometer in size. In still a further embodiment, the interphase region is from about 1 to about 100 nm in size. In another embodiment, the interphase region is from about 10 to about 50 nm in size.

Other physical and chemical properties may also be used to characterize the regions of the nanoparticles. For example, hardness modulus may be used to characterize and distinguish between regions. In one embodiment, the modulus of the shell is less than the modulus of the interphase region, which is less than the modulus of the core ($M_s < M_i < M_c$). In another embodiment, the modulus of the shell is much less than the modulus of the interphase region, which is less than the modulus of the core ($M_s \ll M_i < M_c$). In a further embodiment, the modulus of the shell is less than the modulus of the interphase region, which is much less than the modulus of the core ($M_s < M_i \ll M_c$). As another example, volume fraction can be used to characterize the regions of the nanoparticles. In one embodiment, the volume fraction of the interphase region is from about 1% to about 99% of the nanoparticle. In another embodiment, the volume fraction is from about 5% to about 95%. In a further embodiment, the volume fraction is from about 10% to about 80%. As a further example, the heterogeneity of one or more physical and/or chemical properties may be used to characterize and distinguish between regions. In one embodiment, the regions possess different amounts of stiffness. In another embodiment, the regions have different glass transition temperatures. In a further embodiment, the regions have different densities. The heterogeneous complexity of the interphase nanoparticles may provide overall benefits to compositions, such as rubber, comprising the nanoparticles, such as reduced rolling resistance and increased traction.

Figure 5:
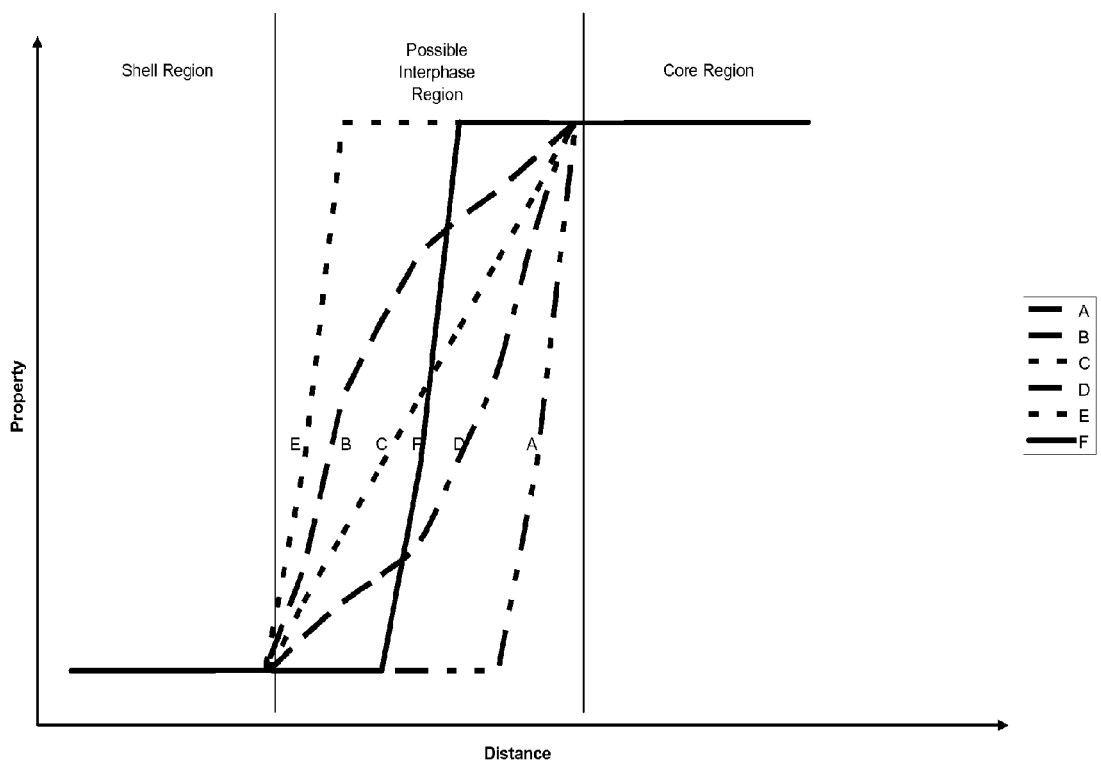
FIG. 5 is a graph depicting various embodiments of polymeric nanoparticles according to the present invention, as a function of a physical property over distance toward the core.
Figure 6:
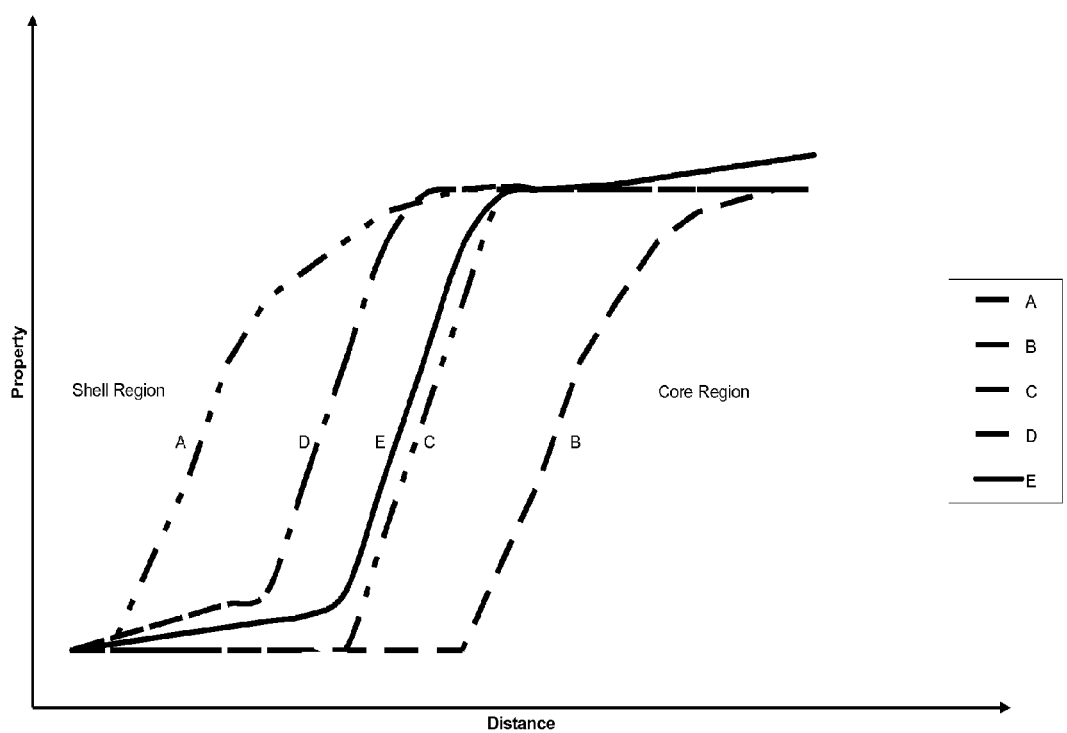
FIG. 6 is a graph depicting various embodiments of polymeric nanoparticles according to the present invention, as a function of a physical property over distance toward the core.

FIGS. 5 and 6 are graphs representing various embodiments of polymeric nanoparticles according to the present invention, in which a core region and a shell region are separated and connected by an interphase region. The horizontal axis represents distance toward the core, with the center of the core region on the right of the axis and the end of the shell region on the left of the axis. The vertical axis represents a physical property, such as glass transition temperature or hardness modulus, which increases in value from the bottom of the axis to the top.

Line A of FIG. 5 represents one embodiment of a polymeric nanoparticle according to the present invention with a narrow interphase region, in which the core region is smaller in size than the shell region, and in which the interphase region displays a near linear change in the physical property throughout its distance. Line B of FIG. 5 represents another embodiment of a polymeric nanoparticle according to the present invention with a wide interphase region, in which the interphase region displays the physical property decreasing but approximate to that of the core region for much of its distance, followed by a more pronounced drop in the physical property closer to the shell region. Line C of FIG. 5 represents a further embodiment of a polymeric nanoparticle according to the present invention with a wide interphase region, in which the interphase region displays a near linear change in the physical property throughout its distance. Line D of FIG. 5 represents yet another embodiment of a polymeric nanoparticle according to the present invention with a wide interphase region, in which the interphase region displays the physical property increasing but approximate to that of the shell region for much of its distance, followed by a more pronounced rise in the physical property closer to the core region. Line E of FIG. 5 represents yet a further embodiment of a polymeric nanoparticle according to the present invention with a narrow interphase region, in which the core region is larger in size than the shell region, and in which the interphase region displays a near linear change in the physical property throughout its distance.

Line A of FIG. 6 represents one embodiment of a polymeric nanoparticle according to the present invention with a wide interphase region, wherein both the interphase region and the core region are larger than the shell region. Line B of FIG. 6 represents another embodiment of a polymeric nanoparticle according to the present invention, wherein both the shell region and the interphase region are larger than the core region. Line C of FIG. 6 represents a further embodiment of a polymeric nanoparticle according to the present invention, wherein the core and shell are approximately the same size and wherein the physical property continues to increase within the core region. Line D of FIG. 6 represents a further embodiment of a polymeric nanoparticle according to the present invention, wherein the core region is larger than both the shell region and the interphase region, and wherein the physical property displays greater increases within the interphase region than the increases displayed within the shell region. Line E of FIG. 6 represents yet another embodiment of a polymeric nanoparticle according to the present invention, wherein the core region is larger than both the interphase region and the shell region, and wherein the physical property displays greater increases within the interphase region than the increases displayed in both the shell region and the core region.

Composition of Nanoparticles

The core, shell, and interphase region of the inventive polymeric nanoparticles may be made from polymerizable monomers, which may be referred to herein as units. At least one monomer that polymerizes to form the core region may be referred to herein as a core monomer. At least one monomer that polymerizes to form the shell region may be referred to herein as a shell monomer. The core, shell, and at least one interphase region of the polymeric nanoparticles may be formed from one polymer, such as a random, a monoblock, or a multiblock polymer, or from different polymers bonded or otherwise aggregated together.

Monomer composition refers to the type or types of monomers that, when polymerized, comprise a region or layer of the polymeric nanoparticle. In one embodiment, the monomer composition of the shell is different from the monomer composition of the core. In another embodiment, the monomer composition of the interphase region is the same as the monomer composition of the core. In a further embodiment, the monomer composition of the interphase region is different than the monomer composition of at least one of the core and shell. In yet another embodiment, the monomer composition of the interphase region is chosen from the monomers comprising the core and the shell.

Monomer configuration refers to the ordering or arrangement of monomers within a region or layer after polymerization. In one embodiment, the monomer configuration is repeating, such that the monomers in a region or layer are arranged in a substantially definable pattern. In another embodiment, the monomer configuration is random, such that the monomers in a region or layer are not arranged in a substantially definable pattern. In a further embodiment, the monomer configuration is structured, such that at least two types of monomers in a block are arranged in groups. In yet another embodiment, the monomer configuration is tapered, such that a first end or side of region or layer comprises at least a first type of monomer, a second end or side of the region or layer comprises at least second type of monomer different from the first type of monomer, and a transition region comprising both types of monomers separates the first end and the second end. The transition region may comprise repeating monomer units, random monomer units, or a blend of monomer units. A blend of monomer units comprises a higher concentration of the first type of monomer in the portion of the transition region closest to the first end or side of the region or layer, and a higher concentration of the second type of monomer unit in the portion of the transition region closest to the second end or side of the region or layer.

Crosslinking may occur in a region or layer of the polymeric nanoparticle. Crosslinking density, as used herein, refers to the amount of crosslinking in a region or layer of the polymeric nanoparticle. When crosslinking is present, a region or layer of the polymeric nanoparticle may be fully, substantially, or partially crosslinked. In one embodiment, the shell is at least partially crosslinked. In another embodiment, the core is at least partially crosslinked. In a further embodiment, the interphase region is at least partially crosslinked. In yet another embodiment, monomers within one or more polymers of a region are at least partially crosslinked. A region or layer of the polymeric nanoparticle may also have various crosslinking densities. In one embodiment, a region has a relatively constant crosslinking density. In another embodiment, a region has a density gradient, in which the density of the region is greater at one end and smaller at another end. In a further embodiment, a region has a varying density, in which the density of the region varies from one end to the other (or from one side to the other).

The monomers of the polymeric nanoparticles polymerize, which forms the core, shell, and interphase regions. Differences in monomer composition, monomer configuration, and crosslinking density may create layers or regions within at least one of the core, the shell, and an interphase region of the polymeric nanoparticles. In one embodiment, the monomers of the polymeric nanoparticles may form one or more polymers, two or more of which assemble to form the polymeric nanoparticle. The polymers that comprise the nanoparticles may differ in at least one of monomer composition, monomer configuration, and crosslinking density. In another embodiment, the monomers of the polymeric nanoparticles may form one or more random polymers, two or more of which assemble to form at least a part of the polymeric nanoparticle. In a further embodiment, the monomers of the polymeric nanoparticles may form one or more multiblock polymers, two or more of which assemble to form the polymeric nanoparticle. Multiblock polymers are well-known in the art and, as used herein, refer to polymers with at least two blocks of polymerized monomers. A block, as used herein, is a portion of a multiblock polymer that differs in at least one of monomer composition and monomer configuration from another portion of the multiblock polymer.

In one embodiment, the core and shell may each comprise one or more polymers. In another embodiment, the core and shell may each comprise one or more blocks of two or more multiblock polymers. In a further embodiment, the core comprises a first block of the multiblock polymers, the shell comprises a second block of the multiblock polymers, and the interphase region comprises the portion of the multiblock polymers separating the core and the shell. In yet another embodiment, the core comprises a first block of the multiblock polymers, the shell comprises a second and a third block of the multiblock polymers, and the interphase region may be a second block or the portion of the multiblock polymer separating the core and the shell. In yet a further embodiment, the core comprises a first block of the multiblock polymers, the shell comprises a third block of the multiblock polymers, and the interphase region the second block of the multiblock polymer separating the core and the shell. In another embodiment, an interphase region connects a shell comprised of multiblock polymers and a core comprised of other polymers. In still a further embodiment, an interphase region connects a shell comprised of polymers and a core comprised of different polymers.

In one embodiment, the polymeric nanoparticles comprises from about 20 to about 5000 polymers. In another embodiment, the polymeric nanoparticles comprise from about 50 to about 1000 polymers. In yet another embodiment, the polymeric nanoparticles may comprise about 200 polymers.

The polymeric nanoparticles may be made from any monomer currently or hereafter known in the art to be polymerizable. In one embodiment, the monomers are alkenylbenzene units. In another embodiment, the monomers are conjugated diene units. In a further embodiment, the monomers are acrylates. In yet another embodiment, the monomers are diacrylates. In yet a further embodiment, the monomers are triacrylates. In still another embodiment, the monomers are any chemical structure that may be polymerized through anionic polymerization.

Alkenylbenzene units or vinyl-substituted aromatic hydrocarbon monomers may include, for example, styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, and t-butoxystyrene, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. In one embodiment, the alkenylbenzene unit is styrene.

Conjugated diene monomers may include, for example, $C_4$-$C_8$ conjugated diene monomers. In another embodiment, the conjugated diene monomer is 1,3-butadiene. In a further embodiment, the conjugated diene monomer is isoprene. In yet another embodiment, the conjugated diene monomer is 1,3-pentadiene.

Acrylate monomers include, for example, methylacrylate and phenylacrylate.

Diacrylate monomers include, for example, the following monomers:

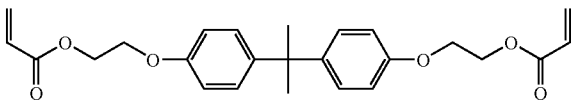

Bisphenol A ethoxylate diacrylate

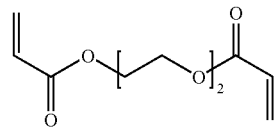

(Diethylene glycol) diacrylate

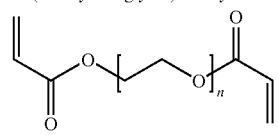

Poly(ethylene glycol) diacrylate

Triacrylate monomers include, for example, the following monomers:

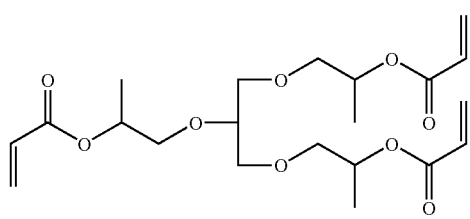

Glycerol propoxylate triacrylate

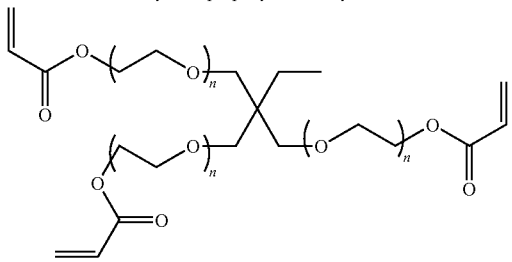

Trimethylol propane ethoxylate triacrylate

The size of the polymeric nanoparticles may be controlled to a certain desired diameter. The diameter of the nanoparticles, as used herein, means mean average diameter. In one embodiment, the nanoparticles have a diameter of less than about 250 nm. In another embodiment, the nanoparticles have a diameter of less than about 100 nm. In a further embodiment, the nanoparticles have a diameter of less than about 75 nm. In yet another embodiment, the nanoparticles have a diameter of less than about 50 nm. Methods of controlling the size of the polymeric nanoparticles include, for example, controlling polymerization temperature, controlling solvent polarity, controlling the concentration of monomer, controlling the ratios of monomers that may be present for polymerization (when more than one monomer is present for polymerization), and the types of monomer(s) used for polymerization. In one embodiment, a polymerization temperature below about 170° C. may yield polymeric nanoparticles smaller than about 500 nm in diameter. In another embodiment, a temperature of about room temperature, or about 70° F., may yield polymeric nanoparticles smaller than about 500 nm in diameter. In a further embodiment, a temperature of below about room temperature, or below about 70° F., may yield polymeric nanoparticles smaller than about 500 nm in diameter.

The polymeric nanoparticles of the present invention may possess a molecular weight ($M_W$) of at least about 1,000. The $M_W$ of the polymeric nanoparticles may be measured, for example, using gel permeation chromatography (GPC, also known as size exclusion chromatography). GPC measurements, however, may be based on linear standards that may result in skewed or otherwise under-reported molecular weights. As such, the $M_W$ of the polymeric nanoparticles may actually be as much as an order of about ten, or more, higher than reported by GPC using linear standards. In addition, the polymeric nanoparticles may be too large in diameter to be measured with GPC. Despite those limitations, measurements of $M_W$ values discussed in the present application are those taken by GPC using linear standards. In one embodiment, regardless of the measurement technique, the $M_W$ of the polymeric nanoparticles is from about 10,000 to about 300,000,000. In another embodiment, regardless of the measurement technique, the $M_W$ of the polymeric nanoparticles is from about 500,000 to about 1,500,000.

The dispersity or size distribution of the polymeric nanoparticles may also be controlled. As used herein, dispersity is represented by the ratio of $M_w$ to $M_n$, with a ratio of about 1 being substantially monodisperse. In one embodiment, the nanoparticles have a dispersity of less than about 1.3. In another embodiment, the nanoparticles have a dispersity of less than about 1.1. In a further embodiment, the nanoparticles have a dispersity of about 1.05. In yet another embodiment, the nanoparticles have a dispersity of about 1.

Figure 2:
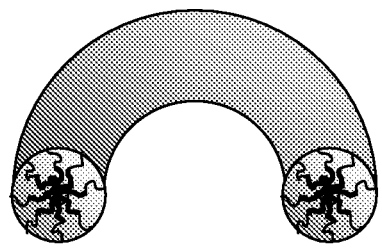
FIG. 2 is a nanoparticle of the present invention in string shape.
Figure 3:
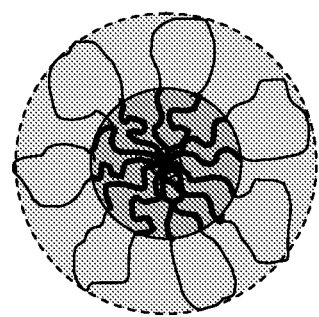
FIG. 3 is a nanoparticle of the present invention in flower shape.

The shape of the polymeric nanoparticles may also be controlled. In one embodiment, the nanoparticles are spherical or substantially spherical, as shown in FIG. 1a. In another embodiment, the nanoparticles have a string shape, as shown in FIG. 2. In a further embodiment, the nanoparticles have a flower shape, as shown in FIG. 3. In another embodiment, the nanoparticles have an ellipsoid shape.

The shapes of the nanoparticles may be controlled by various methods, for instance: (1) varying the concentration of monomers during polymer formation; (2) including at least three blocks of a multiblock polymer, or at least two polymers, in the core or shell, and (3) varying the molecular weight of the polymers used to create the polymeric nanoparticles. In one embodiment, the core may include a triblock polymer represented by the formula S-B-S, in which S indicates a styrene block and B represents a butadiene block. In one such embodiment, the triblock polymer is a portion of a larger multiblock polymer. In another embodiment, the molecular weight is varied by increasing the ratio of shell monomer to core monomer, which may produce nanoparticles with an ellipsoid shape.

Figure 1B:
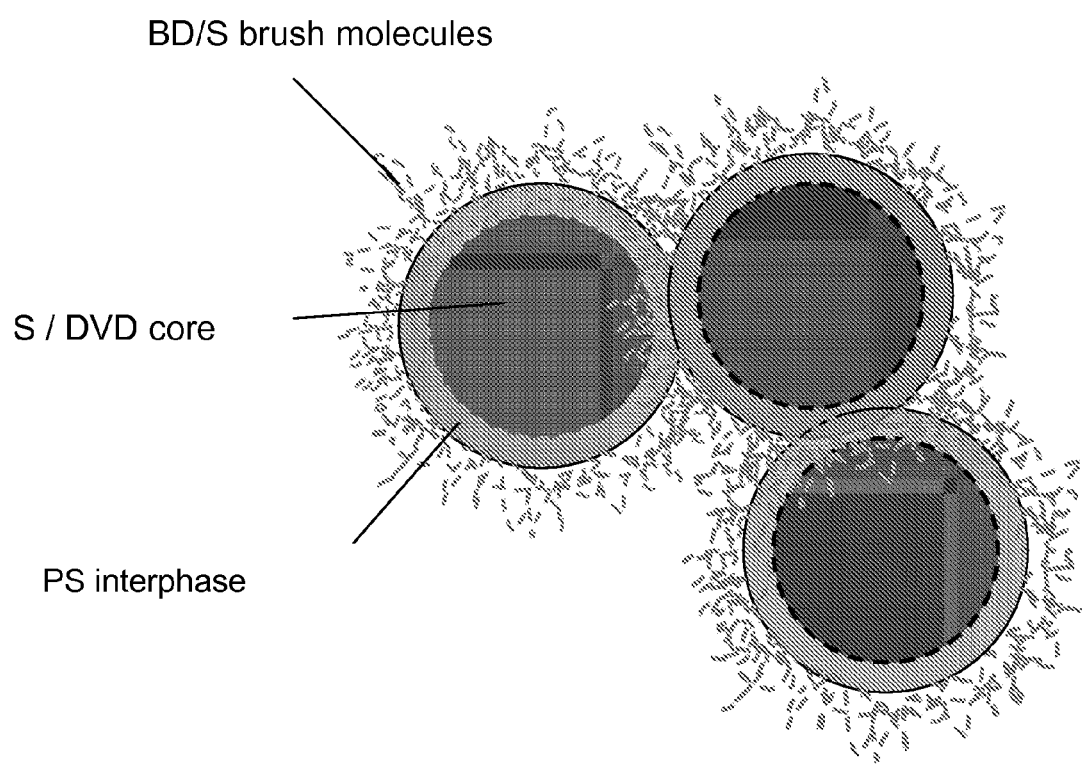
FIG. 1b is another embodiment of several spherical-shaped nanoparticles of the present invention interacting and attached to each other at their interphase regions.

The agglomeration properties of the nanoparticles may also be adjusted to achieve particular properties. In one embodiment, the nanoparticles retain a relatively discrete nature with little or no chemical or physical interaction or connection between them. In another embodiment, the nanoparticles may interact or connect with each other at their interphase regions, as shown for example in FIG. 1b. In particular, FIG. 1b depicts an embodiment in the which the nanoparticles are comprised of a styrene/divinylbenzene core, a relatively narrow polystyrene interphase region, and a butadiene/styrene shell in the form of brushes. Such an embodiment may lead, for example, to unexpectedly improved physical properties when the interacting nanoparticles are compounded into a rubber composition. In a further embodiment, the nanoparticles may interact or connect with each other at their shell regions. FIG. 1b also depicts some interaction between nanoparticles at their shell regions.

Methods of Polymerization and of Producing Nanoparticles

The core, shell, and interphase region of the polymeric nanoparticles may be formed through any one or multiple forms of any known or hereafter discovered polymerization process. In one embodiment, such polymerization processes may form clusters of the monomer or monomers for a particular region, before the region itself and/or the polymeric nanoparticle is formed. In another embodiment, a polymerization process forms clusters of polymerized monomers that will later form the shell region of the polymeric nanoparticle.

In one embodiment, the regions of the polymeric nanoparticles are formed using emulsion polymerization. For example, formation of interphase nanoparticles may occur through a multi-step process, starting with the synthesis of crosslinked nanosized globules by conventional microemulsion copolymerization of polystyrene, divinylbenzene, and ethylvinylbenzene. Then, in further steps, styrene-butadiene rubbers, monomers, or monomer mixtures of various compositions and molecular weights may be surface grafted onto the pre-formed core particle through post-free radical solution polymerizations, which may include metering the rubbers, monomers, or monomer mixtures into the polymerization chamber. The resulting nanoparticles would have an interphase region and, in particular, an interphase region with a tapered structure (such as transitioning from substantially all styrene to substantially all butadiene).

In another embodiment, the regions of the polymeric nanoparticles are formed using dispersion polymerization. In a further embodiment, the regions of the polymeric nanoparticles are formed using solution polymerization. In yet another embodiment, the polymeric nanoparticle is formed through the polymerization of at least one core monomer in the presence of a polymerized shell region or shell clusters. In yet a further embodiment, a polymeric nanoparticle is formed through copolymerization of at least one core monomer and at least one crosslinking agent in the presence of a polymerized shell region or shell clusters.

One or more polymerization steps may be used to form the polymeric nanoparticles. In addition, one or more polymerization steps may also be used to form each of the core, shell, and interphase region. The time and temperature of each polymerization may be adjusted depending on the particular requirements for the core, shell, interphase region, or polymeric nanoparticle.

One or more hydrocarbons may be used as a solvent for dispersion polymerization. Such hydrocarbons may include, for example, aliphatic hydrocarbons (such as pentane, hexane, heptane, octane, nonane, and decane) and alicyclic hydrocarbons (such as cyclohexane, methyl cyclopentane, cyclooctane, cyclopentane, cycloheptane, cyclononane, and cyclodecane). With respect to the monomers and solvents identified herein, nanoparticles may be formed with dispersion polymerization by maintaining a temperature that is favorable to polymerization of the selected monomers in the selected solvent(s). In one embodiment, the temperature is from about −80° C. to about 250° C. In another embodiment, the temperature is from about 0° C. to about 150° C. In a further embodiment, the temperature is from about 50° C. to about 80° C. As described in more detail below, the interaction of monomer selection, temperature, and solvent may facilitate the formation of polymer(s) comprising the core, the shell, and the interphase region and, ultimately, the desired polymeric nanoparticles.

In one embodiment, a diblock polymer for use in preparing polymeric nanoparticles according to the present invention may be formed by the polymerization of vinyl aromatic hydrocarbon monomers and conjugated diene monomers in a hydrocarbon solvent, such as hexane. In such an embodiment, the diblock polymer may contain a first block that is soluble in the solvent, which may be a block comprised of conjugated diene monomer and representing the shell, and a second block that is less soluble in the solvent, which may be a block comprised of vinyl-substituted aromatic hydrocarbon monomer and representing the core. In another such embodiment, the vinyl-substituted aromatic hydrocarbon monomer may be insoluble in the solvent.

In another embodiment, a diblock polymer for use in preparing polymeric nanoparticles according to the present invention may be formed by living anionic polymerization, a form of dispersion polymerization known in the art. In one embodiment, living anionic polymerization involves the addition of the core monomer(s) (which may create at least a portion of the interphase region) to the shell monomer(s) and/or at least a portion of the interphase region that have already been completely polymerized. In another embodiment, living anionic polymerization involves the addition of vinyl-substituted aromatic hydrocarbon monomer to a completely polymerized conjugated diene monomer. In another embodiment, a mixture of core monomer(s) may be subjected to living anionic copolymerization with the shell monomer(s), which may create at least a portion of the interphase region.

In a further embodiment, a diblock polymer for use in preparing polymeric nanoparticles according to the present invention may be formed by the living anionic copolymerization of a mixture of conjugated diene monomer and a vinyl-substituted aromatic hydrocarbon monomer in a hydrocarbon solvent. In such an embodiment, the living anionic copolymerization may be conducted in the presence of polar additives, such as, for example, ethers, tertiary amines, and metal alkoxides. In another such embodiment, the living anionic copolymerization may be conducted in the absence of polar additives (such as, for example, ethers, tertiary amines, and metal alkoxides) that could otherwise effect the polymerization of the separately constituted polymer blocks, for example, by producing a randomizing effect or affecting the 1,2-microstructure content. Under such conditions, substantially all of the conjugated diene monomer polymerizes first, forming a first block of the diblock polymer, followed by the polymerization of both monomers, which may form an interphase region, followed by polymerization of substantially all of the vinyl-substituted aromatic hydrocarbon monomer, forming the second block of the diblock polymer.

In yet another embodiment, regardless of whether living anionic polymerization or copolymerization is used, the shell may polymerize and be formed first, followed by the interphase region, followed by the core. In such an embodiment, the living end of the polymerizing polymer may be positioned on an end of a core polymer or block to facilitate crosslinking. Also in such an embodiment, the shell may comprise polymerized conjugated diene monomer and the core may comprise polymerized vinyl-substituted aromatic hydrocarbon monomer.

Living anionic polymerization or living anionic copolymerization may be initiated by the addition of at least one anionic initiator known in the art to polymerize or copolymerize at least one of the monomers comprising at least one of the core, the shell, and the interphase region. Mixtures of anionic initiators may be used. Anionic initiators may be used in amounts ranging from about 0.01 to about 60 millimoles per hundred grams of monomer. In one embodiment, the at least one anionic initator is an organo-lithium catalyst having the formula $R(Li)_x$, wherein R represents a $C_1$-$C_{20}$ hydrocarbyl radical and x is an integer from 1 to 4. R may also represent a $C_2$-$C_8$ hydrocarbyl radical. R groups may include, for example, aliphatic radicals and cycloaliphatic radicals. R groups may also include, for example, primary, secondary, and tertiary groups, such as n-propyl, isopropyl, n-butyl, isobutyl, and t-butyl.

For example, lithium initiators that may be used in the present invention include mono-lithium and multi-lithium initiators. In one embodiment, the at least one anionic initiator is ethyllithium, propyllithium, butyllithium, aryllithium (such as, for example, phenyllithium and tolyllithium), alkenyllithium (such as, for example, vinyllithium and propenyllithium), alkylene lithium, lithium dialkyl amines, lithium dialkyl phosphines, lithium alkyl aryl phosphines, and lithium diaryl phosphines. In one embodiment, the at least one anionic initiator is n-butyllithium. In another embodiment, the at least one anionic initiator is sec-butyllithium. In a further embodiment, the at least one anionic initiator is tert-butyllithium. In yet another embodiment, the at least one anionic initiator is chosen from one of p-tolyllithium, 4-phenylbutyl lithium, 4-butylcyclohexyl lithium, and 4-cyclohexylbutyl lithium. In yet a further embodiment, the at least one anionic initiator is a dilithium initiator chosen from alkylene dilithiums (such as tetramethylene dilithium, pentamethylene dilithium, hexamethylene dilithium, and decamethylene dilithium), arylene dilithiums (such as 1,3-dilithiobenzene), 1,3,5-trilithiocyclohexane, 1,2,5-trilithionapthalene, 1,3,5,8-tetralithiodecane, and 1,2,3,5-tetralithio-4-hexyl anthracene. In still another embodiment, the at least one anionic initiator is a trilithium initiator. Mixtures of lithium initiators may be used.

The assembly of the polymeric nanoparticle may take place as an inherent aspect of the polymerization conditions or may be a second, subsequent step. In one embodiment, the formation of the core, the shell, and the interphase region, as well as the assembly of the polymeric nanoparticles, takes place in the same environment or reactor. In one example of such an embodiment, the creation of the core, shell, and interphase region may take place in an environment or reactor in which the thermodynamic nature of at least one of the monomer(s), block(s), or polymer(s) comprising the core, the shell, and the interphase region causes assembly of the polymer nanoparticle. In another example of such an embodiment, the creation of the core, shell, and interphase region may take place in an environment or reactor in which the thermodynamic nature of at least one of the monomer(s), blocks, or polymers comprising the core, the shell, and the interphase region causes the formation of the core, the shell, and the interphase region and assembly of the polymer nanoparticle. In a further example of such an embodiment, the core, shell, and the interphase region are formed, and then a change in at least one of the solvent and temperature changes the solubility of at least one of the blocks or polymers comprising the core, the shell, and the interphase region, causing formation of the polymeric nanoparticles. In yet another example of such an embodiment, the core, shell, and the interphase region are formed, and then a change in at least one of the solvent and temperature changes the solubility of at least one of the monomer(s), blocks, or polymers to form the core, the shell, and the interphase region and to cause formation of the polymeric nanoparticles. In another embodiment, the formation of any one of the core, the shell, and an interphase region takes place in a separate environment from the formation of the polymer nanoparticles.

In one embodiment, at least two multiblock polymers, for instance multiblock polymers with three blocks representing the core, shell, and interphase regions, formed by either living anionic polymerization or copolymerization, in addition to other polymerization methods, may aggregate and self-assemble to form micelle-like structures driven by thermodynamics. Exemplary embodiments of the self-assembly of polymers to form micelle-like structures are generally described in U.S. Patent Application Publication No. 2006-0084722 A1, which is incorporated by reference herein in its entirety. In one such embodiment, the micelle comprises the core region directed toward the center of the micelle and the interphase region and the shell region extending therefrom. In another embodiment, an additional hydrocarbon solvent charge may be used or may be required to obtain formation of the micelle. In a further embodiment, a decrease in polymerization temperature may be used or may be required to obtain formation of the micelle. In an embodiment, the temperature for micelle formation is from about 50° C. to about 80° C. In yet another embodiment, after the micelles have formed, additional monomers, such as conjugated diene monomer, vinyl-substituted aromatic hydrocarbon monomer, or crosslinking agent, may be added to the polymerization mixture to continue core formation or to crosslink the core.

Similar polymeric interphase nanoparticles may also be formed through one of various polymerization techniques, such as, for example, free radical polymerization, living cationic polymerization, atom transfer radical polymerization (ATRP), reversible addition fragmentation chain transfer polymerization (RAFT), condensation polymerization, addition polymerization, and emulsion polymerization.

At least one randomizing agent may be used to control the monomer configuration of at least one of the core, the shell, and the interphase region. In one embodiment, the randomizing agent assists in creating a random polymer, partially random, or block of a multiblock polymer. In another embodiment, the randomizing agent controls the 1,2-microstructure of conjugated diene units in a polymer or in a block of a multiblock polymer. In one such embodiment, the 1,2-microstructure of conjugated diene units is from about 5% to about 95%. In another such embodiment, the 1,2-microstructure of conjugated diene units is greater than about 35%. In a further embodiment, the randomizing agent increases the percentage of 1,2-microstructure in conjugated diene units in a polymer or in a block of a multiblock polymer. In yet another embodiment, the randomizing agent increases the reaction rate of one or more monomers. In yet a further embodiment, the randomizing agent equalizes the reactivity ratio of two or more monomers. In still another embodiment, the randomizing agent both controls the 1,2-microstructure of conjugated diene units in a polymer or in a block of a multiblock polymer, and assists in creating a random polymer or block of a multiblock polymer. In another embodiment, the randomizing agent is provided in an amount less than may be needed to provide perfectly random or substantially random polymers.

The randomizing agent may include, for example, hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs) (such as 2,2-bis(2'-tetrahydrofuranyl)propane), 2,2-bis-(4-methyl dioxane), bis(2-oxolanyl)methane, 1,1-bis(2-oxolanyl)ethane, 2,2-bis(2-oxolanyl)propane, 2,2-bis(5-methyl-2-oxolanyl)propane, 2,2-bis-(3,4,5-trimethyl-2-oxolanyl)propane, 2,5-bis(2-oxolanyl-2-propyl)oxolane, octamethylperhydrocyclotetrafurfurylene, 2,2-bis(2-oxolanyl)butane, and bistetrahydrofuryl propane. In one embodiment, the randomizing agent is OOPs. OOPs may be comprised of one or more oligomers chosen from linear oxolanyl oligomers and cyclic oxolanyl oligomers. A mixture of one or more randomizing agents may be used.

In one embodiment, the ratio of the randomizing agent to the monomers may vary from about 0 to about 3000 millimoles per 100 grams of monomer. In another embodiment, the ratio is from about 0.01 millimoles to about 400 millimoles of modifier per 100 grams of monomer. In a further embodiment, the amount of the randomizing agent varies in accordance with the amount of initiator used for polymerization. In yet another embodiment, the amount of randomizing agent is determined by ratio to the amount of initiator, when used. In still another embodiment, the ratio of the randomizing agent to the initiator is from about 0.5:1 to about 5:1. In yet a further embodiment, the ratio of the randomizing agent to the initiator is from about 1:1 to about 3:1. In still a further embodiment, the ratio of the randomizing agent to the initiator is about 3:1.

Functionalization of Nanoparticle

The polymeric nanoparticle may be functionalized. The polymers comprising the core, the shell, and the interphase region may be functionalized prior to, during, or after formation of the polymeric nanoparticle. Functionalization of the polymer or polymers comprising the core, the shell, and the interphase region, or of the polymeric nanoparticle itself, may add one or more polymeric chains to a polymer or the nanoparticle, one or more functional groups to a polymer or the nanoparticle, or one or more layers to the nanoparticle. In one embodiment, a diblock polymer may be functionalized to form a triblock polymer. In another embodiment, the polymeric nanoparticle may be functionalized to add an additional layer to the shell. In a further embodiment, functionalization occurs through the use of an appropriate polymerization initiator. In yet another embodiment, functionalization occurs through the use of functionalized monomers to form the polymers comprising at least one of the core, the shell, and the interphase region.

The polymeric nanoparticle may optionally be hydrogenated. In one embodiment, the polymeric nanoparticle is hydrogenated. In another embodiment, the shell of the polymeric nanoparticle is hydrogenated. Hydrogenation techniques that are known in the art may be used in the optional hydrogenation step.

Crosslinking within Nanoparticle Regions

Crosslinking within the regions comprising the polymeric nanoparticles may be accomplished through the addition of at least one crosslinking agent. In one embodiment, at least one crosslinking agent is co-polymerized with at least one monomer comprising the core. In another embodiment, at least one crosslinking agent is added after formation of the polymers comprising at least one of the core, the shell, and the interphase region, resulting in the crosslinking of at least one of the core, the shell, and the interphase region. In yet another embodiment, at least one crosslinking agent is polymerized after assembly of the polymeric nanoparticles, resulting in polymerized crosslinking agent being attached to the shell of the nanoparticles, resulting in the polymerized crosslinking agent being a part of the nanoparticles.

The at least one crosslinking agent may be any agent known to crosslink to itself and/or to at least one monomer that comprises the polymeric nanoparticle. In one embodiment, a crosslinking agent is selected that has an affinity to at least one monomer in the core. In one example of such an embodiment, the crosslinking agent migrates to the center of formed micelles due to its compatibility with the monomer units and initiator residues present in the center of the micelle and its relative incompatibility with the dispersion solvent and monomer units present in the outer portions of the micelle. In another embodiment, the crosslinking agent crosslinks the polymers or monomer units in the core of the micelle to form the core of the polymer nanoparticle.

In one embodiment, the crosslinking agent is multifunctional, i.e., the crosslinking agent comprises at least two functional groups capable of reacting either with each other and/or with at least one monomer that comprises the polymeric nanoparticle. In one embodiment, the crosslinking agent is bifunctional and is capable of reacting with at least one core monomer. In another embodiment, the crosslinking agent is a divinyl substituted aromatic hydrocarbon. In a further embodiment, the crosslinking agent is a trivinyl substituted aromatic hydrocarbon.

In one embodiment, the crosslinking agent is a multiacrylate, for example, a diacrylate, a triacrylate, or a tetraacrylate. In another embodiment, the crosslinking agent is divinylbenzene (DVB). DVB may contain a mixture of different chemical structures. Commercially available DVB generally contains at least two isomers of DVB, or at least two of ortho-divinylbenzene ("o-DVB"), meta-divinylbenzene ("m-DVB"), and para-divinylbenzene ("p-DVB"). In addition, commercially available divinylbenzene may contain ethylvinylbenzene ("EVB"), in at least one of the o-EVB, m-EVB, and p-EVB forms. Further, commercially available divinylbenzene may contain diethylbenzene ("DEB") in at least one of the o-DEB, m-DEB, and p-DEB forms. Such commercially available DVB may be referred to as "technical-grade," such as that purchased from Aldrich. In one embodiment, the use of various isomers of a crosslinking agent assists in the formation of the interphase region. In another embodiment, the use of various isomers of a crosslinking agent influences the crosslinking density of a block. In a further embodiment, the use of various isomers of a crosslinking agent influences the crosslinking density of the core block.

Nanoparticles in Rubber Compositions

Figure 19:
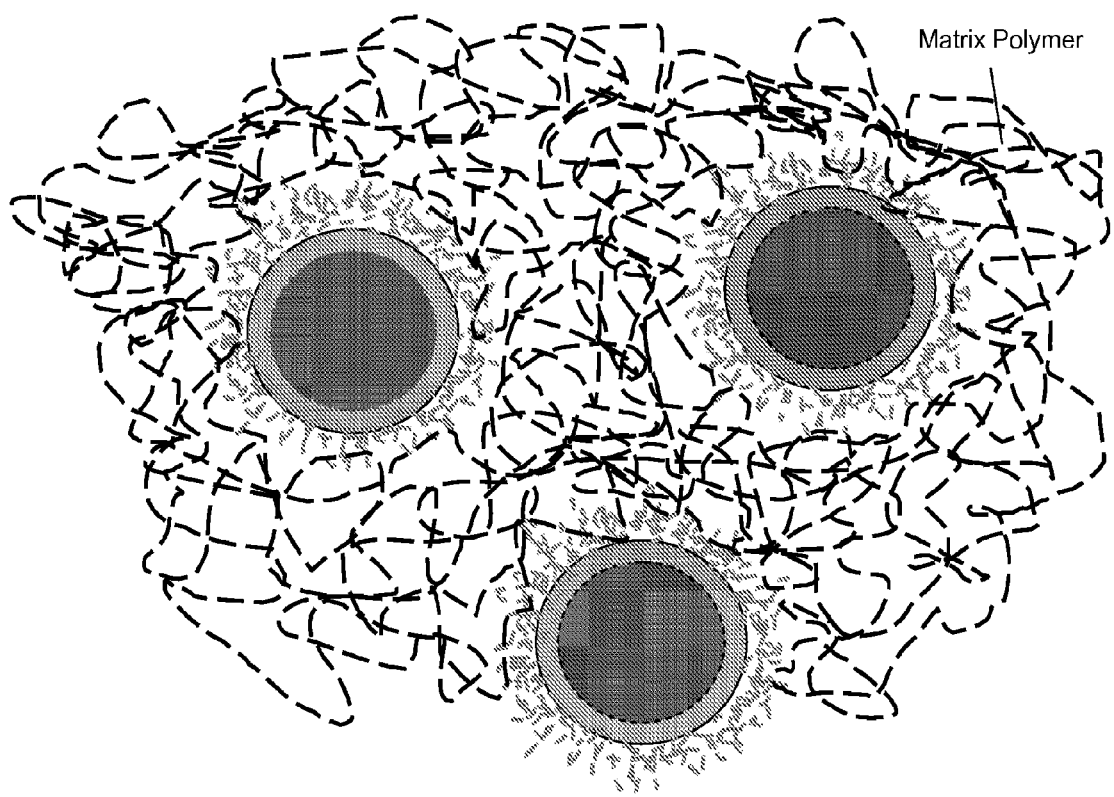
FIG. 19 depicts one embodiment of interphase nanoparticles according to the present invention dispersed in a rubber polymer matrix.

After the polymeric nanoparticles have been formed, they may be blended with at least one rubber to improve the physical characteristics of the rubber composition. In one embodiment, the polymeric nanoparticles may be discrete particles that are capable of dispersing uniformly throughout the rubber composition, resulting in uniformity of physical characteristics. Furthermore, the polymeric nanoparticles with a shell or surface layer comprising poly(conjugated diene), and in particular vinyl-modified poly(conjugated diene), may be advantageous because the shell or surface layer may be capable of bonding with the rubber matrix due to the accessibility of the pendant vinyl groups. FIG. 19 shows one embodiment of a morphology of nanoparticles according to the present invention dispersed in a rubber matrix polymer.

Interaction or agglomeration between the nanoparticles in the polymer matrix may also increase one or more beneficial physical characteristics of the matrix, for example, an increase in the low strain modulus of the rubber composition. In one embodiment, the polymeric nanoparticles, after dispersion in a polymer matrix, may interact and attach to each other. In another embodiment, polymeric nanoparticles interacting between each other, as shown for example in FIG. 1b, may separate and disperse upon blending in a polymer matrix, and then re-attach to each other. In one embodiment, interacting nanoparticles added to the matrix polymer may separate and disperse because of shear or mixing forces. In another embodiment, interacting nanoparticles added to the matrix polymer may separate and disperse because of the relatively high temperature of the mixing, for example, about 160° C. In a further embodiment, interacting nanoparticles separated when mixed with the matrix polymer may resume interactions upon annealing, for example at about 165° C.

The polymeric nanoparticles may be suitable for modifying a variety of rubbers including, but not limited to, random styrene/butadiene copolymers, butadiene rubber, poly(isoprene), nitrile rubber, polyurethane, butyl rubber, and ethylene propylene diene rubber (EPDM). In one embodiment, spherical polymeric nanoparticles according to the present invention may demonstrate improved tensile and/or tear strength of at least about 1% over other non-spherical copolymers. In another embodiment, spherical polymeric nanoparticles according to the present invention may demonstrate improves tensile and/or tear strength of at least about 10% over other non-spherical copolymers. In a further embodiment, spherical polymeric nanoparticles according to the present invention may demonstrate improves tensile and/or tear strength of at least about 30% over other non-spherical copolymers. In yet another embodiment, the nanoparticles may be used in conjunction with, or to partially or wholly replace, various fillers in rubber compositions, such as carbon black. When used in a rubber, the polymeric nanoparticles may also demonstrate improved fading characteristics and/or improved traction. In addition, the polymeric nanoparticles may be used as a host for other inorganic materials, such as nano-composites. The rubber may be extended using techniques known in the art.

The dynamic properties of the nanoparticle-containing rubber compositions may be measured. The sheer storage modulus (G') and the shear loss modulus (G") may be measured using conventional techniques at specific temperatures, or over a range of temperatures. Higher values of G' may indicate that a composition has good cornering properties. Higher values of G" may indicate that a composition has increased wet and/or dry traction. Tan-δ (also called loss tangent) is defined as G"/G' and is useful for quantifying the balance between energy loss and storage of the rubber compound tested. In one embodiment, rubber compositions comprising interphase nanoparticles according to the present invention have an unexpectedly higher G" across a range of strain %, and thus better traction properties, than rubber compositions comprising carbon black particles. In another embodiment, rubber compositions comprising interphase nanoparticles according to the present invention have relatively low tan-δ across a range of strains %than rubber compositions comprising HIGHLY REINFORCING carbon black particles, indicating that the nanoparticle compositions have better overall rolling resistance.

One particular application for polymeric nanoparticle rubber compounds is tire rubber formulations. Specifically, such formulations are contemplated for use in rubber compounds used to make tire treads and side walls.

Control of Interphase Region

As discussed in U.S. Pat. No. 6,437,050, which is incorporated by reference herein in its entirety, polymer nanoparticles may be prepared in part by the simultaneous addition of alkenylbenzene units and DVB. In one embodiment of such a preparation, a polymerization reactor may be simultaneously charged with 1,3-butadiene and styrene, followed by n-butyl lithium initiator and OOPS randomizer, which over time will prepare the shell of the nanoparticle. Then an additional amount of n-butyl lithium initiator may be added, followed by the simultaneous addition of styrene and DVB, which over time will prepare the core of the nanoparticle. The core of the resultant nanoparticle comprises styrene/DVB copolymer, while the shell comprises random styrene/butadiene copolymer. The nanoparticle may be said to possess an interphase region between the core and shell. For the inventive polymeric nanoparticles described herein, at least the ability to control or enhance their physical and chemical properties (for instance, by modifying the interphase region present therein) is unexpectedly greater. Furthermore, for the inventive polymeric interphase nanoparticles described herein, the performance of a composite material comprising the polymeric interphase nanoparticles is unexpectedly improved.

In one embodiment of the present invention, polymeric nanoparticles may be produced with a relatively thick interphase region between the core and tapered shell that possesses a gradient in glass transition temperature, in part through the simultaneous addition of alkenylbenzene units and DVB without the use of a randomizer. In such a preparation, a polymerization reactor may be simultaneously charged with 1,3-butadiene and styrene, followed by n-butyl lithium initiator, which over time will prepare the tapered shell and interphase region of the nanoparticle. Part of the tapered shell contributes to, and is considered part of, the relatively thick interphase region, as the styrene concentration increases. Then an additional amount of n-butyl lithium initiator may be added, followed by the simultaneous addition of styrene and DVB, which will prepare the core and allow the formation of the nanoparticle. The core of the resultant nanoparticle comprises styrene/DVB copolymer, the interphase region comprises styrene/butadiene copolymer that is rich in styrene, and the shell comprises styrene/butadiene copolymer. In an additional embodiment of this preparation, the first charge of n-butyl lithium initiator may include a small amount of OOPS randomizer.

In another embodiment of the present invention, polymeric nanoparticles may be produced with a relatively thick interphase between the core and shell that possesses a gradient in glass transition temperature, in part through the simultaneous addition of alkenylbenzene units and DVB with the use of a randomizer. In such a preparation, a polymerization reactor may be charged with 1,3-butadiene followed by n-butyl lithium initiator, which over time will prepare the shell of the nanoparticle. Then a charge of OOPs randomizer is added, followed by the simultaneous addition of styrene and 1,3-butadiene, which over time will prepare the interphase region of the nanoparticle. Then styrene and DVB may be simultaneously added, which will prepare the core of the nanoparticle. The core of the resultant nanoparticle comprises styrene/DVB copolymer, the interphase region comprises styrene/butadiene copolymer, and the shell comprises polybutadiene. In an additional embodiment of this preparation, the charge of styrene and DVB may include a small amount of a randomizer, which may or may not be OOPs but which may create a highly uniformly crosslinked core.

In another embodiment of the present invention, polymeric nanoparticles may be produced with a relatively narrow to substantially non-existent interphase between the core and shell, in which the core is highly uniformly crosslinked, in part through the incremental addition of simultaneous amounts of alkenylbenzene units and DVB without the use of a randomizer. In such a preparation, a polymerization reactor may be simultaneously charged with 1,3-butadiene and styrene, followed by n-butyl lithium initiator and OOPs randomizer, which over time will prepare the shell of the nanoparticle. Then an additional amount of n-butyl lithium initiator may be added, followed by multiple (e.g., four) charges of simultaneously added styrene and DVB, which over time will prepare the core of the nanoparticle. The core of the resultant nanoparticle comprises highly uniformly crosslinked styrene/DVB copolymer, while the shell comprises random styrene/butadiene copolymer, and the nanoparticle has a narrow to substantially no interphase region between the core and shell. In another embodiment of this preparation scheme, the addition of styrene and DVB may be accomplished through slow and simultaneous metering of those components into the reactor, rather than providing them in separate and independent charges.

In a further embodiment of the present invention, polymeric nanoparticles may be produced with a relatively narrow interphase region between the core and shell, in which the core is highly uniformly crosslinked, in part through the incremental addition of simultaneous amounts of alkenylbenzene units and DVB with the use of a randomizer. In such a preparation, a polymerization reactor may be simultaneously charged with 1,3-butadiene and styrene, followed by n-butyl lithium initiator and OOPs randomizer, which over time will prepare the shell of the nanoparticle. Then an additional amount of n-butyl lithium initiator and a randomizer, which may or may not be OOPs, may be simultaneously added, followed by the simultaneous addition of styrene and DVB, which will prepare the core of the nanoparticle. The core of the resultant nanoparticle comprises highly uniformly crosslinked styrene/DVB copolymer, while the shell comprises random styrene/butadiene copolymer, and the nanoparticle has a narrow to substantially no interphase region between the core and shell.

In yet another embodiment of the present invention, polymeric nanoparticles may be produced with a relatively narrow to substantially non-existent interphase between the core and shell, in which the core possesses a gradient of glass transition temperature and/or hardness, in part through the incremental addition of simultaneous amounts of alkenylbenzene units and DVB without the use of a randomizer in differing ratios. In such a preparation, a polymerization reactor may be simultaneously charged with 1,3-butadiene and styrene, followed by n-butyl lithium initiator and OOPs randomizer, which over time will prepare the shell of the nanoparticle. Then an additional amount of n-butyl lithium initiator may be added, followed by multiple (e.g., four) charges of simultaneously added styrene and DVB in differing ratios, which over time will prepare the core of the nanoparticle. For instance, the charges may contain a small but progressively increasing amount of DVB, and a large but progressively decreasing amount of styrene. Such a charging sequence would create a nanoparticle core with a smaller degree of crosslinking closer to the shell. As another example, the charges may contain a small but progressively increasing amount of styrene, and a large but progressively decreasing amount of DVB. Such a charging sequence would create a nanoparticle core with a larger degree of crosslinking closer to the shell. Thus, the core of the resultant nanoparticle comprises styrene/DVB copolymers with varying degrees of crosslinking density, while the shell comprises random styrene/butadiene copolymer, and the nanoparticle has a relatively narrow to substantially no interphase region between the core and shell. In another embodiment of this preparation scheme, the addition of styrene and DVB may be accomplished through slow and simultaneous metering of different amount of those components into the reactor, rather than providing them in separate and independent charges.

The present invention now will be described with reference to a non-limiting example. The following example and table are presented for purposes of illustration only and are not to be construed in a limiting sense.

EXAMPLE ONE

This example produced polymeric nanoparticles with no interphase region, or a very sharp interphase region. A two gallon reactor equipped with external jacket heating and internal agitation was used for solution polymerization. 1,3-Butadiene was used as a 22.2 weight percent solution in hexane. Styrene was used as a 33.0 weight percent solution in hexane. n-Butyl lithium was used as a 1.60 M solution in hexane. Technical grade DVB (80% as a mixture of isomers) was purchased from Aldrich and stored on alumina beads and calcium hydride. Neat OOPS was passed through a column of inhibitor remover under N2 before use and used as a 1.6 M solution in hexane, stored over calcium hydride. Hexane (solvent), isopropanol (to terminate live ends) and IRGANOX 1520 L (synthetic antioxidant, Ciba) were used as supplied.

The reactor was charged with a batch of 2.39 kilograms of hexane, 0.25 kilograms of styrene blend, and 1.23 kilograms of butadiene blend. The temperature of the batch was increased towards 48.9° C. by adjusting the reactor jacket temperature. When the batch reached 47° C., 2.0 mL of n-butyl lithium and 0.67 mL of OOPs were added, both diluted together with about 20 mL of hexane. The polymerization exothermed at about 49.7° C. after about five minutes of reaction.

After one hour, the temperature of reactor jacket was decreased to 37.8° C. A sample was dropped for analysis. 4 mL of n-butyl lithium was added to the reactor, followed by a mixture of 420 g of styrene blend and 25 mL DVB prepared in a bottle. The temperature of the reactor jacket was then increased to 82.2° C. Samples of approximately 20 mL in size were taken every five minutes for thirty minutes, and then every thirty minutes until three hours of reaction time, and were terminated with 1 mL of isopropanol.

After three hours of reaction, the temperature of the reactor jacket was decreased and the remaining mixture was dropped in isopropanol containing IRGANOX 1520 L. The solid was then filtered through cheesecloth and drum-dried.

The resulting polymeric nanoparticles had a crosslinked styrene/DVB core with an SBR shell. The samples collected during the second part of the synthesis were analyzed by GPC and gas chromatography. According to GPC, the SBR shell had a molecular weight of 97,500. The resulting polymeric nanoparticles showed an Mp of 612,400 by GPC (based on linear standards), with about 73% coupling (i.e., purity or yield of particles).

Figure 4:
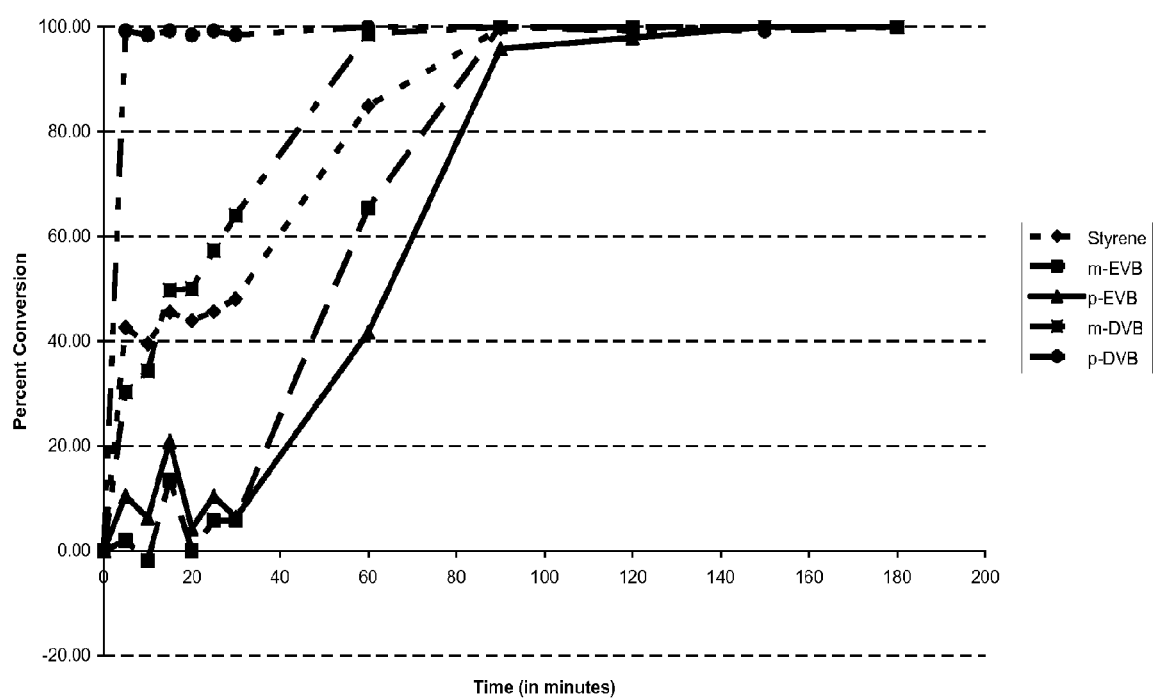
FIG. 4 is a graph depicting the results shown in Table 1.

TABLE 1 represents the gas chromatography data, which is displayed in the graph of FIG. 4, and shows that p-DVB tends to react first, which suggests a higher cross-linking density on the outside of the core in an interphase region. Specifically, the p-DVB is consumed almost immediately. As polymerization progressed, the remaining components of the DVB mixture were consumed more slowly—first the m-DVB was consumed, followed by m-EVB and p-EVB. The difference in rates of consumption for the components of the DVB mixture lead to different crosslinking densities, compositions, and strengths between the interphase region and the core.

TABLE 1

| Time (min) | Percent Conversion | | | | |
|---|---|---|---|---|---|
| | Styrene | m-EVB | p-EVB | m-DVB | p-DVB |
| 0 | 0 | 0 | 0 | 0 | 0 |
| 5 | 42 | 1 | 10 | 30 | 99 |
| 10 | 39 | −1 | 6 | 34 | 98 |
| 15 | 45 | 13 | 20 | 49 | 99 |
| 20 | 43 | 0 | 4 | 50 | 98 |
| 25 | 45 | 5 | 10 | 57 | 99 |
| 30 | 48 | 5 | 6 | 64 | 98 |
| 60 | 84 | 65 | 41 | 98 | 100 |
| 90 | 99 | 100 | 95 | 100 | 100 |
| 120 | 99 | 100 | 97 | 100 | 99 |
| 150 | 99 | 100 | 100 | 100 | 99 |
| 180 | 99 | 100 | 100 | 100 | 100 |

EXAMPLE TWO

Figure 7:
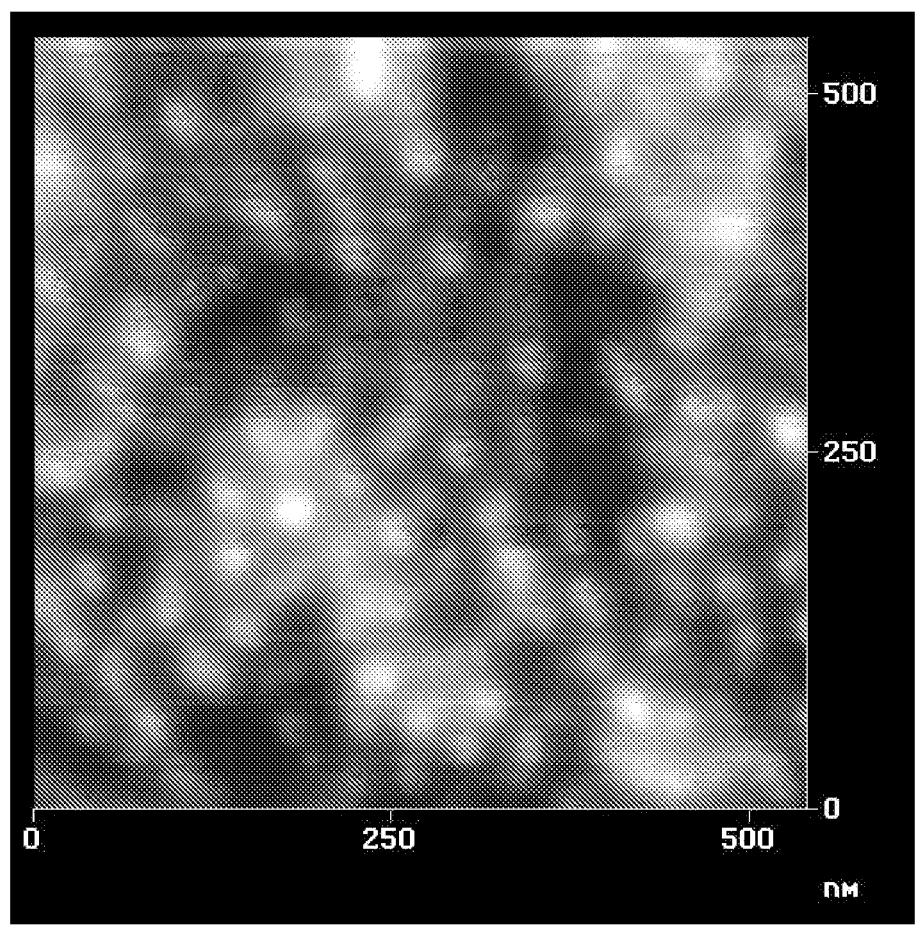
FIG. 7 is an atomic force micrograph of nanoparticles without an interphase region according to the present invention, made according to EXAMPLE 2.
Figure 8:
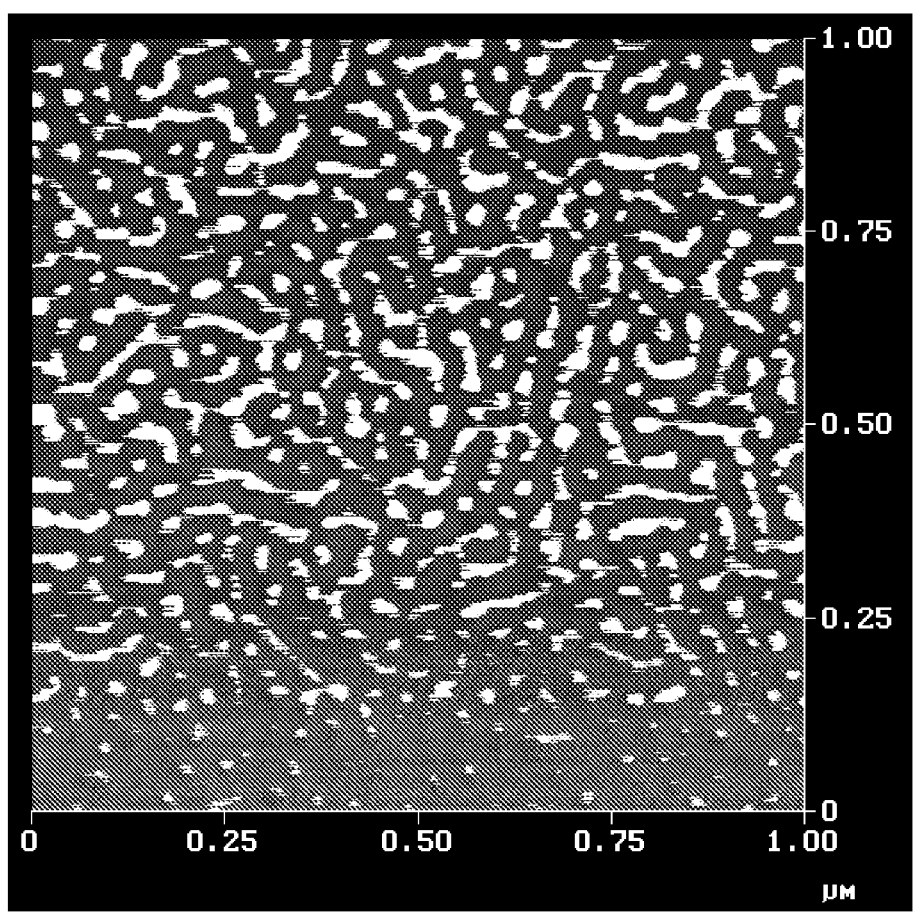
FIG. 8 is another atomic force micrograph of the nanoparticles without an interphase region according to the present invention, made according to EXAMPLE 2.

This example produced polymeric nanoparticles with no interphase region, or a very sharp interphase region, thus not in accordance with the present invention. A one gallon polymerization reactor was used for solution polymerization, which was first charged with 1.18 kilograms of hexane, and then was charged with 0.56 kilograms of a butadiene/hexane blend containing 21.6 wt % of butadiene. That batch was then heated to 71.1° C. After the temperature stabilized, polymerization was initiated with 3.13 mL of a 1.6 M solution of butyl lithium in hexane. The batch temperature was maintained at 71.1° C. for the duration of the polymerization. After 45 minutes (when the reaction was finished), the reactor was charged with 0.34 kilograms of a styrene/hexane blend containing 33 wt % of styrene. After an additional 30 minutes of reaction, the reactor was charged with 25 mL of technical grade divinylbenzene (80% purity, Aldrich). The reactor was maintained at 71.1° C. for another 90 minutes, and a small amount of the product was taken for GPC analysis. That GPC analysis showed that the resulting nanoparticles had an average molecular weight of 790,100. The dispersity of the nanoparticles was 1.14. The conversion of the polymerization was about 100%. The particle purity in the product was about 88% percent. FIG. 7 shows an electron micrograph and FIG. 8 shows an atomic force micrograph of the particles made in this Example.

EXAMPLE THREE

Figure 9:
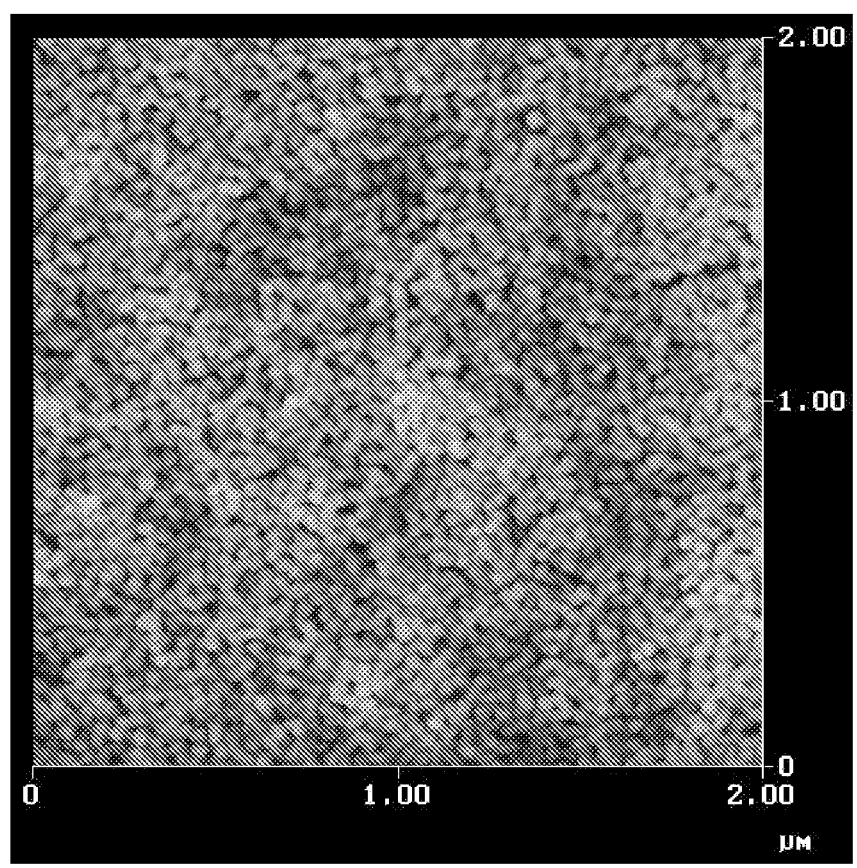
FIG. 9 is an atomic force micrograph of the polymeric interphase nanoparticles made according to EXAMPLE 3.
Figure 10:
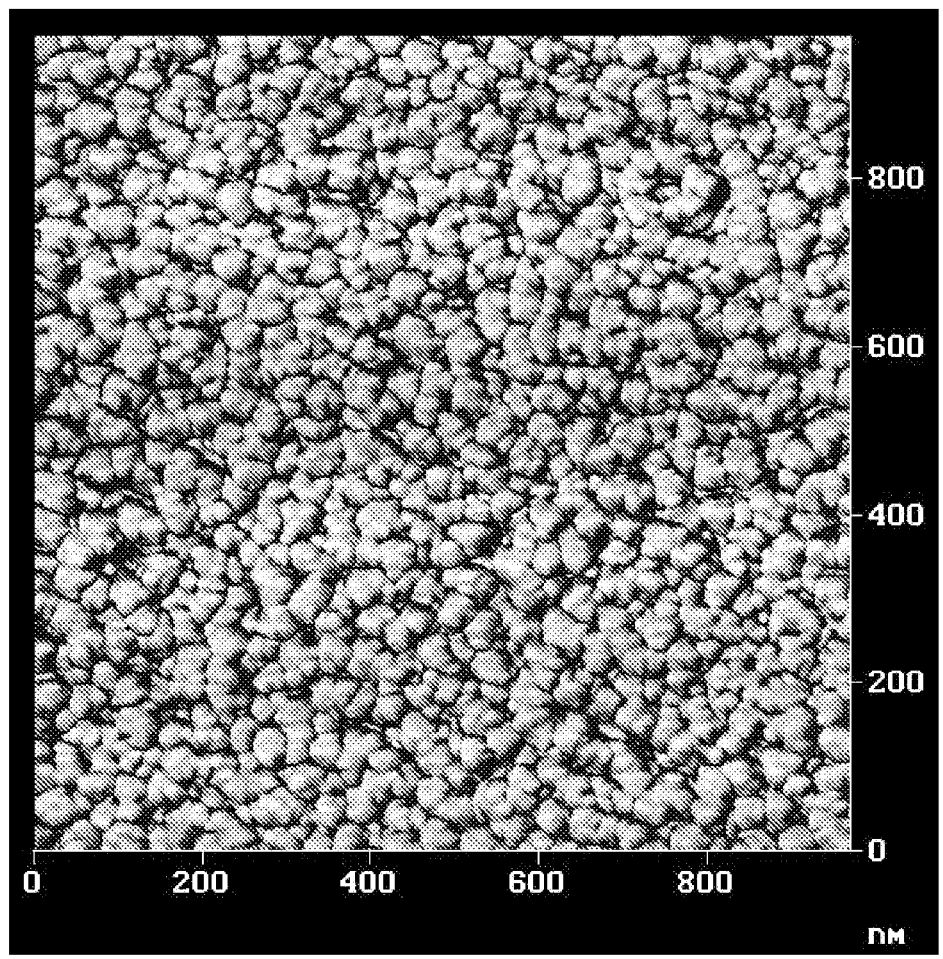
FIG. 10 is another atomic force micrograph of the polymeric interphase nanoparticles made according to EXAMPLE 3.
Figure 11:
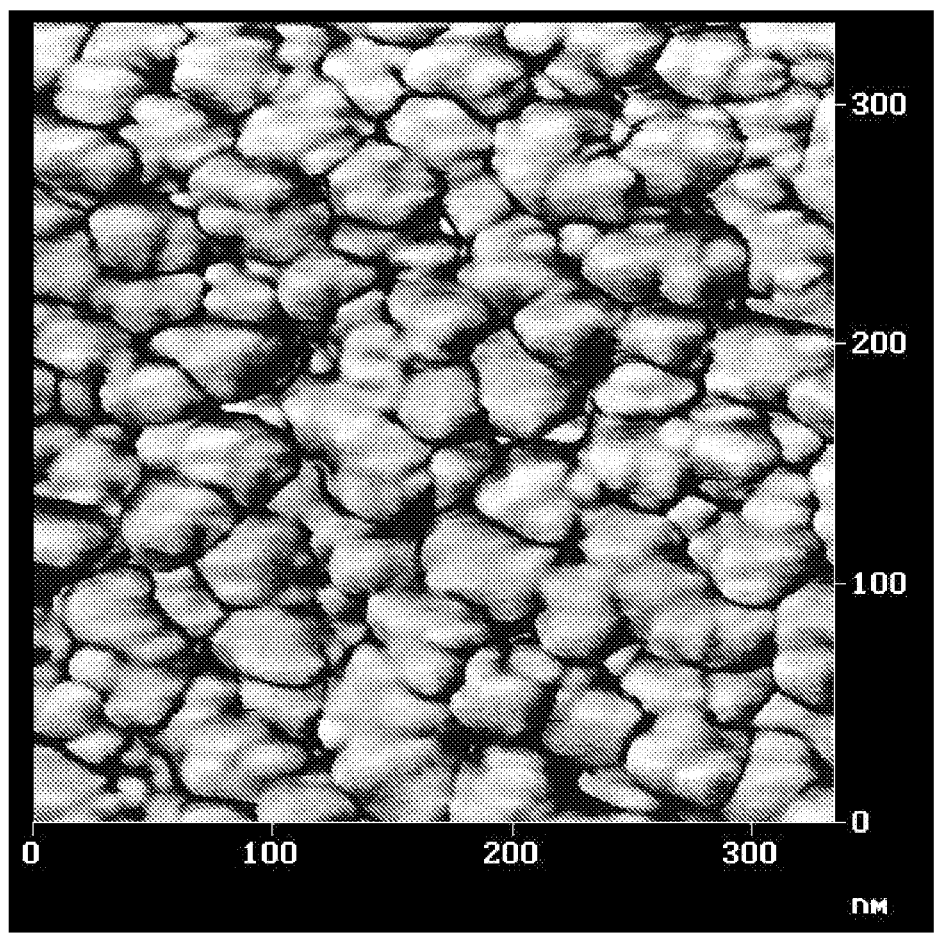
FIG. 11 is a further atomic force micrograph of the polymeric interphase nanoparticles made according to EXAMPLE 3.

Example Three prepared polymeric nanoparticles with an interphase region, in accordance with the present invention. A one gallon polymerization reactor was used for solution polymerization, which was first charged with 1.14 kilograms of hexane, then was charged with 0.59 kilograms of a butadiene/hexane blend containing 21.6 wt % of butadiene, and then was charged with 0.20 kilograms of a styrene/hexane blend containing 33 wt % of styrene. The batch was first set to 18.3° C., at which point 1.68 mL of a 1.6 M solution of butyl lithium in hexane was added to the reactor. It then took about 15 minutes for the temperature of the batch to reach 71.1° C. After that temperature rise, the batch temperature was maintained at 71.1° C. for 4.5 hours, by which time the reaction was finished. This process resulted in a tapered microstructure styrene/butadiene copolymer. The reactor was then cooled to 18.3° C., at which point the reactor was charged with 5.63 mL of a 1.6 M solution of butyl lithium in hexane, 0.74 pounds of a styrene/hexane blend containing 33 wt % of styrene, and 25 mL of technical grade divinylbenzene (80% purity, Aldrich). The reactor was heated back to 71.1° C. and maintained at that temperature for 40 minutes. The reactor was then charged with 0.31 kilograms of a styrene/hexane blend containing 33 wt % of styrene, and also charged with 25 mL of the technical grade divinylbenzene. After those charges, the batch temperature was maintained at 71.1° C. for 2 hours. The resulting product was dropped into a isopropanol/BHT (1000/1) solution. A small amount of that product was then taken for GPC analysis. The GPC analysis showed that the resulting nanoparticles had a average molecular weight of 2,678,500. The conversion of the polymerization was about 100%. The particle purity in the product was about 94%. FIGS. 9-11 show electron force micrographs of the particles made in this Example at varying levels of magnification.

EXAMPLES FOUR AND FIVE

A sample of polymeric nanoparticles with an interphase region according to Example 3 (denoted as "Example 5"), as well as a sample of polymeric nanoparticles without an interphase region according to Example 2 (denoted as "Example 4"), were first dispersed into a low-cis butadiene rubber (40% cis, 40 Mooney polybutadiene, butyl lithium catalyzed, continuous PZN, Tg at −90° C., made by Firestone Polymers) via solution mixing in toluene, then dried. The control compound was prepared by dry mixing of butadiene rubber and 50 phr of carbon black of grade N339 in the Brabender mixer. The Control, Example 4, and Example 5 were mixed with other compounding ingredients in a 65-gram Brabender mixer, going through three stages of mixing and following conventional and well-known procedures for achieving good mixing. The formulation is reflected in Table 2.

TABLE 2

| | Control | Example 4 | Example 5 |
|---|---|---|---|
| Master Batch | | | |
| Low-Cis BR | 100 | 100 | 100 |
| N339 (Carbon Black) | 50 | 0 | 0 |
| Polymeric Nanoparticles (EXAMPLE 2) | 0 | 74.09 | 0 |
| Polymeric Interphase Nanoparticles (EXAMPLE 3) | 0 | 0 | 74.09 |
| Aromatic Oil (Exxon Sundex 790) | 10 | 0 | 0 |
| Antioxidant 6PPD (N-(1,3-dimethylbutyl)-N'-phenyl-p-phenylene diamine) (Flexsys) | 1 | 1.11 | 1.11 |
| Stearic Acid | 2 | 2.22 | 2.22 |

TABLE 2-continued

|  | Control | Example 4 | Example 5 |
|---|---|---|---|
| Final Batch | | | |
| Zinc Oxide | 3 | 2.2 | 2.2 |
| Accelerator DPG (diphenyl guanidine) | 0 | 0.222 | 0.222 |
| Accelerator MBTS (benzothiazyl disulfide) | 0 | 0.556 | 0.556 |
| Accelerator TBBS (N-tert-butyl-2-benzothiazyl sulfenamide) | 0.8 | 0.556 | 0.556 |
| Sulfur | 1.3 | 1.44 | 1.44 |

The mixed compounds were sheeted into specimens of different shapes suitable for the testing of various physical properties. Those specimens were then vulcanized in suitable molds at 165° C. under high pressure for 15 minutes. Testing of various physical properties was performed for the vulcanized compounds of the Final Batch. Results from tensile tests at room temperature (RT, about 23° C.) are summarized in the Table 3. Mod300% is the engineering stress at 300% elongation. Tb is the engineering or tensile stress at break. Eb is the elongation at break.

TABLE 3

|  | Control | EXAMPLE 4 | EXAMPLE 5 |
|---|---|---|---|
| Mod300% (MPa) | 5.14 | 3.47 | 3.73 |
| Tb (MPa) | 13.8 | 6.07 | 14.0 |
| Eb % | 570.0 | 702.5 | 1108.0 |
| Rebound at 50° C. | 47.2 | 43.2 | 44.8 |

Figure 12:
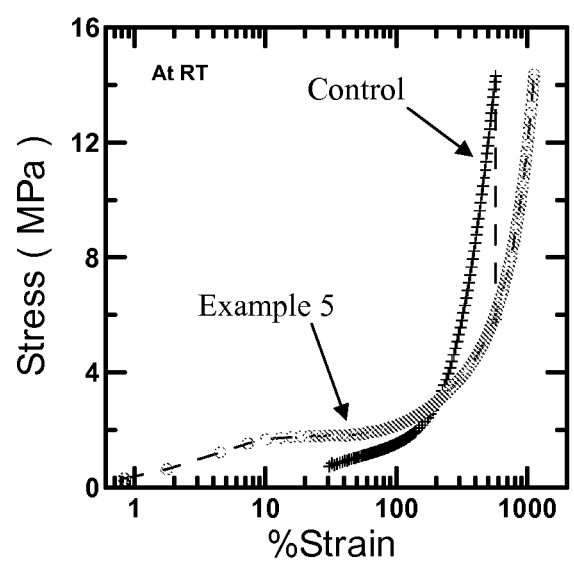
FIG. 12 is a graph depicting the stress-strain curve of two rubber compositions, including a control and one composition according to EXAMPLE 5.

From the results shown in Table 3, we can see that the Sample 5 containing the inventive polymeric nanoparticles with at least one interphase region exhibits unexpected super-elasticity. Its tensile at break, and especially its elongation at break, far exceeded those for the control compound, which contained no polymeric nanoparticles and instead contained 50 phr of conventional reinforcing carbon black. The stress-strain curves for those two compounds are displayed in FIG. 12. EXAMPLE 4, which contained polymeric nanoparticles without an interphase region according to the present invention, did not exhibit the extent of super-elasticity as EXAMPLE 5. It is also notable that the compositions with nanoparticles of Example 5, with a relatively wider interphase region, displayed better elastic properties (particularly Tb and Eb) than the compositions with nanoparticles of Example 4, which did not possess an interphase region. That comparison suggests that the interphase region, along with other nanoparticle parameters, can be tuned so that the compositions have desired physical properties.

EXAMPLES SIX AND SEVEN

Example Six involved the preparation of polymeric nanoparticles in accordance with the present invention. In particular, the nanoparticles had a butadiene/styrene shell region, a styrene/divinylbenzene core region, and a somewhat broad styrene-rich interphase region. The polymerization of this Example was similar to Example 3, except for changes in the reaction temperatures. After the butyl-lithium was added to the reactor, the batch was heated to 60° C. instead of 71.1° C. The reaction temperature was also maintained at 60° C. in later sequences.

Samples of the polymeric interphase nanoparticles from Example Six were compounded into a rubber position as described in Example 5, except that dry mixing was used, creating the composition of Example 7. The formulation for Example 7 is reflected in Table 4. For comparison, a control composition with carbon black particles was prepared in accordance with Example 4 and with the formulation reflected in Table 4.

TABLE 4

|  | Control | Example 7 |
|---|---|---|
| Master Batch | | |
| Low-Cis BR | 100 | 100 |
| N339 (Carbon Black) | 50 | 0 |
| Polymeric Interphase Nanoparticles from Example 6 | 0 | 74 |
| Aromatic Oil (Exxon Sundex 790) | 10 | 10 |
| Antioxidant 6PPD (N-(1,3-dimethylbutyl)-N'-phenyl-p-phenylene diamine) (Flexsys) | 1 | 1 |
| Stearic Acid | 2 | 2 |
| Final Batch | | |
| Zinc Oxide | 2 | 2 |
| Accelerator DPG (diphenyl guanidine) | 0.22 | 0.22 |
| Accelerator MBTS (benzothiazyl disulfide) | 0.55 | 0.55 |
| Accelerator TBBS (N-tert-butyl-2-benzothiazyl sulfenamide) | 0.55 | 0.55 |
| Sulfur | 1.44 | 1.44 |

The mixed compounds were sheeted into specimens of different shapes suitable for the testing of various physical properties. Those specimens were then vulcanized in suitable molds at 165° C. under high pressure for 15 minutes.

Figure 13:
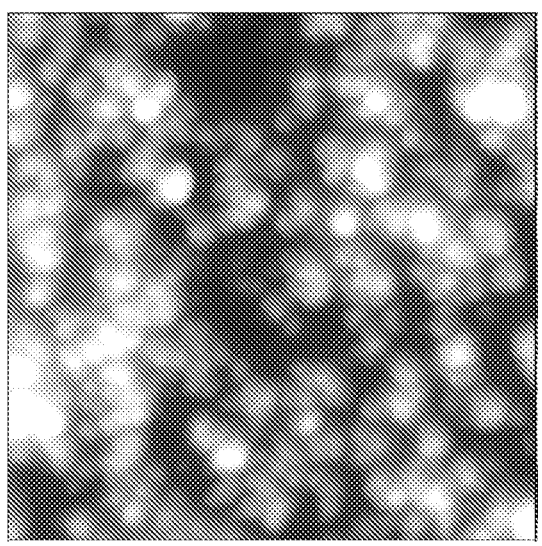
FIG. 13 is an atomic force micrograph showing the dispersion of the carbon black particles in the rubber compound of EXAMPLE 6.
Figure 14:
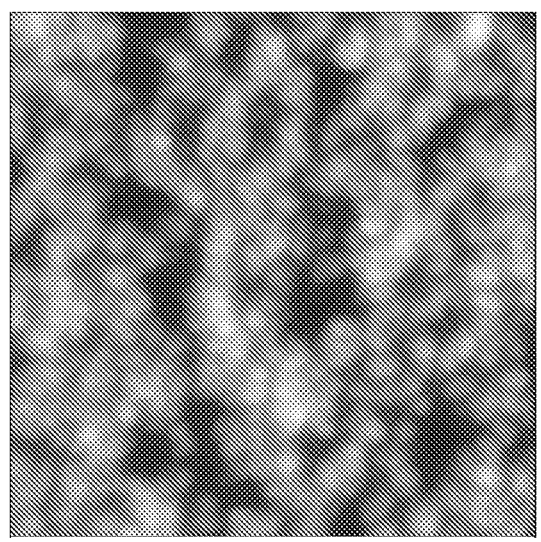
FIG. 14 is an atomic force micrograph showing the dispersion of the interphase nanoparticles from EXAMPLE 6 in the rubber compound.

FIG. 13 is an electron micrograph showing the dispersion of the carbon black particles in the rubber compound. FIG. 14 is an electron micrograph showing the dispersion of the interphase nanoparticles from this Example in the rubber compound. A comparison of FIG. 13 to FIG. 14 reveals that the interphase nanoparticles were more uniformly dispersed in the rubber compound than the carbon black particles.

Testing of various physical properties was performed for the vulcanized compounds of the Final Batch. Results from tensile tests at room temperature (RT, about 23° C.) are summarized in the Table 5. Mod50% is the engineering stress at 50% elongation. Mod300% is the engineering stress at 300% elongation. Tb is the engineering or tensile stress at break. Eb is the elongation at break.

TABLE 5

|  | Control | Example 7 |
|---|---|---|
| Mod50% (MPa) | 1.17 | 1.28 |
| Mod300% (MPa) | 5.67 | 2.41 |
| Tb (MPa) | 13.96 | 12.11 |
| Eb % | 549.2 | 878.1 |

Figure 15:
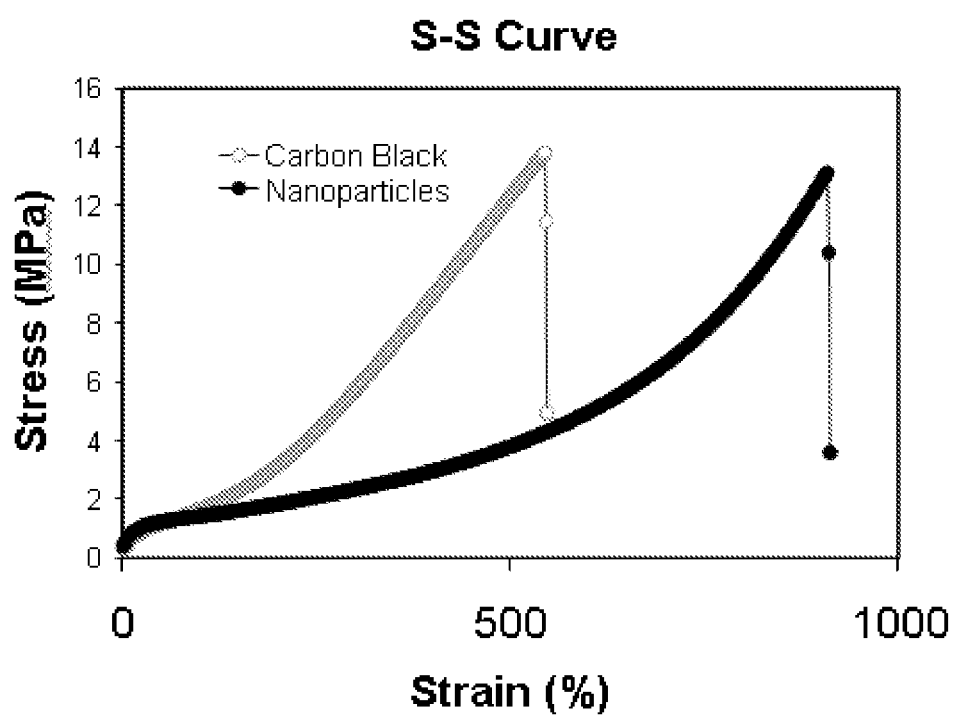
FIG. 15 is a graph depicting the stress-strain curve of the two compositions from EXAMPLE 6.

The results shown in Table 5 indicate that the Example 7 containing the inventive polymeric nanoparticles with at least one interphase region exhibit unexpected super-elasticity. Its tensile at break, and especially its elongation at break, far exceeded those for the control compound, which contained no polymeric nanoparticles and instead contained conventional reinforcing carbon black. The stress-strain curves for those two compounds are displayed in FIG. 15.

Results from dynamic properties testing by temperature sweep (−100° C. to 100° C.). The shear storage modulus (G') and shear loss modulus (G") are summarized in Table 6. Specific results are given for 30° C. and 60° C., and all results were taken at 0.5% strain and 5 Hz. The tests were carried out in a dynamic rheometer machine from Rheometrics Instruments, Inc.

TABLE 6

| Temperature | Modulus | Control | Example 6 |
|---|---|---|---|
| 30° C. | G' (MPa) | 5.5 | 19.9 |
| | G" (MPa) | 1.0 | 1.7 |
| | tan-δ | 0.2 | 0.1 |
| 60° C. | G' (MPa) | 4.5 | 15.2 |
| | G" (MPa) | 0.8 | 1.7 |
| | tan-δ | 0.2 | 0.1 |
| Temperature Sweep | Peak tan-δ | 0.9 | 0.6 |
| | Tg (° C.) | −71.8 | −74.3 |

Figure 16:
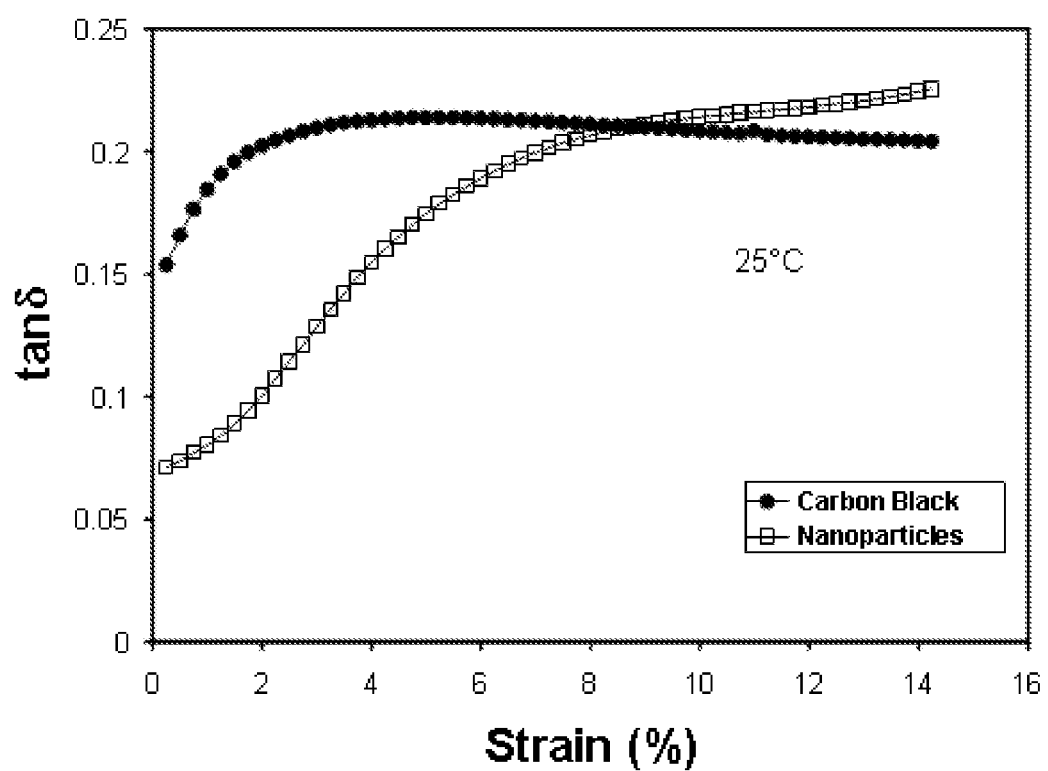
FIG. 16 is a graph showing the tan-δ versus strain (%) at 25° C. of the two compositions from EXAMPLE 6.
Figure 17:
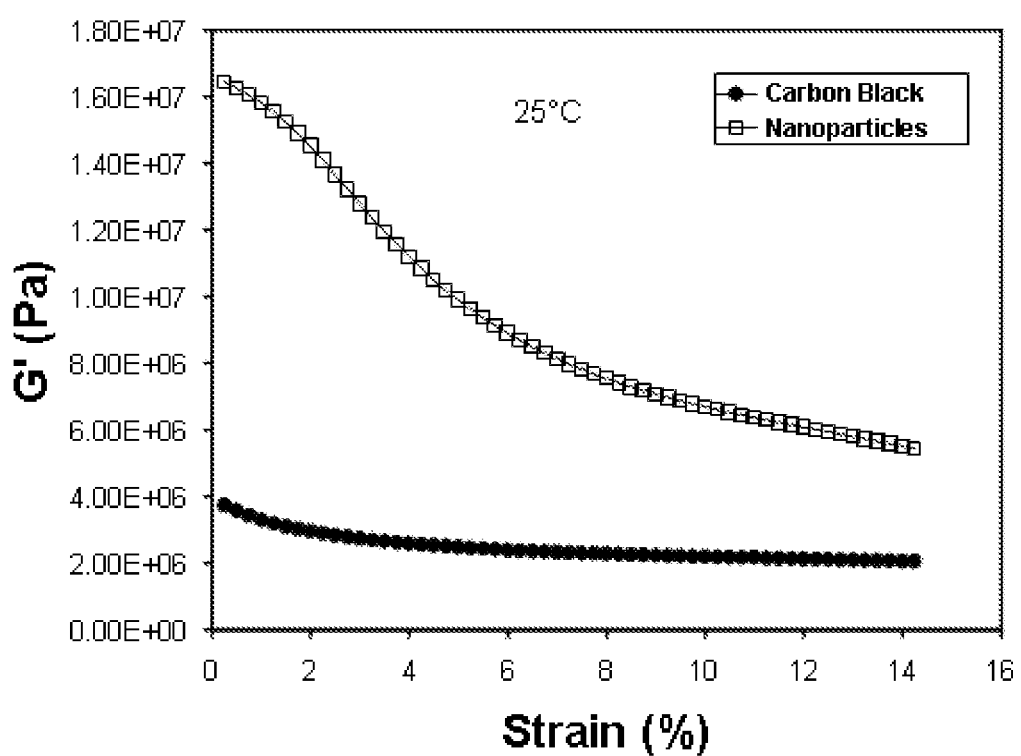
FIG. 17 is a graph showing the G'(Pa) versus strain (%) at 25° C. of the two compositions from EXAMPLE 6.
Figure 18:
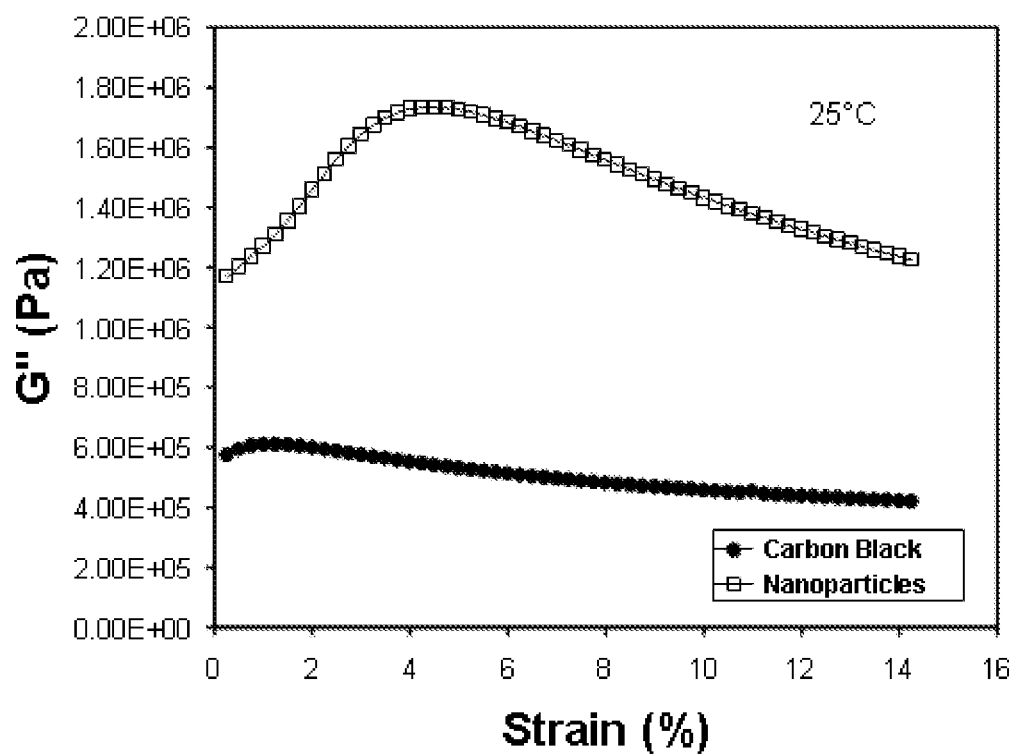
FIG. 18 is a graph showing the G"(Pa) versus strain (%) at 25° C. of the two compositions from EXAMPLE 6.

The results shown in Table 6 indicate that the Sample 6 containing the inventive polymeric nanoparticles with at least one interphase region exhibit unexpectedly better storage modulus and well as loss modulus than the control with carbon black particles, resulting in lower tan-δ. FIG. 16 is a graph showing the tan-δ versus strain (%) at 25° C. and reveals that the tan-δ, and thus the overall energy balance, is relatively constant across a range of strain for the inventive nanoparticles of Example 6, while the carbon black control increases substantially in tan-δ at lower strain before beginning to level off at higher strain. FIG. 17 is a graph showing the G' (Pa) versus strain (%) at 25° C. FIG. 18 is a graph showing the G" (Pa) versus strain (%) at 25° C. The dynamic properties testing reflected in Table 6 and FIGS. 16 to 18 show that rubber compositions containing the inventive nanoparticles of Example 6 were more energy efficient and constant than rubber compositions containing carbon black particles.

The invention has been described with reference to the exemplary embodiments. Modifications and alterations will occur to others upon reading and understanding the specification. The invention is intended to include such modifications and alterations insofar as they come within the scope of the disclosure and claims.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contain certain errors necessarily resulting from the standard deviation found in their respective testing measurements.

We claim:

1. A method of making a polymeric nanoparticle, comprising:
    polymerizing at least one shell monomer and a second monomer to form a shell and an interphase region;
    attaching to the interphase region a core by copolymerizing at least one core monomer different than the at least one shell monomer and at least one crosslinking agent in the presence of the shell; and,
    crosslinking at least the core with the at least one crosslinking agent, thereby forming the polymeric nanoparticle;
    wherein the interphase region separates and connects the core and the shell;
    wherein one of the following steps is performed:
    a. the shell and interphase region are polymerized by adding the shell monomer, subsequently adding the initiator, and subsequently adding a simultaneous charge of the shell monomer and the second monomer; or
    b. the core is polymerized through incremental addition, by multiple charges or metering, of simultaneous amounts of core monomer and crosslinking agent.

2. The method of claim 1, wherein the at least one shell monomer is a conjugated diene.

3. The method of claim 2, wherein the conjugated diene is 1,3-butadiene.

4. The method of claim 1, wherein the at least one core monomer is an alkenylbenzene.

5. The method of claim 4, wherein the alkenylbenzene is styrene.

6. The method of claim 1, wherein the at least one crosslinking agent is divinylbenzene.

7. The method of claim 1, wherein the at least one crosslinking agent IS a divinylbenzene mixture comprising at least two benzenes chosen from ortho-divinylbenzene, meta-divinylbenzene, para-divinylbenzene, ortho-ethylvinylbenzene, meta-ethylvinylbenzene, and para-ethyl vinylbenzene.

8. The method of claim 1, wherein at least one of the core, the shell, and the interphase region comprises at least one additional monomer.

9. The method of claim 1, wherein the at least one interphase region is at least 1 nm.

10. The method of claim 1, wherein the at least one interphase region is from about 1 nm to about 100 nm.

11. The method of claim 10, wherein the at least one interphase region is from about 10 to about 50 nm.

12. The method of claim 1, wherein the hardness modulus of the at least one interphase region is less than the hardness modulus of the core and is greater than the hardness modulus of the shell.

13. The method of claim 1, wherein the volume fraction of the at least one interphase region is from about 1% to about 99%.

14. The method of claim 1, wherein the volume fraction of the at least one interphase region is from about 5% to about 95%.

15. The method of claim 1, wherein the volume fraction of the at least one interphase region is from about 10% to about 80%.

16. The method of claim 1, wherein the nanoparticle is one of spherical, substantially spherical, string, flower, or ellipsoid in shape.

17. The method of claim 1, wherein before crosslinking, the polymers from the second polymerization self-assemble to form micelle structures.

18. The method of claim 1, wherein the second polymerization and the crosslinking occur in the same step.

19. A method of making a polymeric nanoparticle, comprising:
    polymerizing conjugated diene monomers in the presence of at least one anionic initiator to form a shell;
    attaching to the shell a core and an interphase region by copolymerizing alkenylbenzene monomer and a divinylbenzene mixture in the presence of the shell; and,
    crosslinking the core and the interphase region with the divinylbenzene mixture, thereby forming the polymeric nanoparticle;

wherein the interphase region connects and separates the core and the shell and has a greater crosslinking density than the core, and wherein the divinylbenzene mixture comprises para-divinylbenzene and at least one benzene chosen from ortho-divinylbenzene, meta-divinylbenzene, ortho-ethylvinylbenzene, meta-ethylvinylbenzene, and para-ethylvinylbenzene;

wherein one of the following steps is performed:
a. the shell and interphase region are polymerized by adding the shell monomer, subsequently adding the initiator, and subsequently adding a simultaneous charge of the shell monomer and the second monomer; or
b. the core is polymerized through incremental addition, by multiple charges or metering, of simultaneous amounts of core monomer and crosslinking agent.

20. The method of claim 1 wherein the shell and interphase region are polymerized by adding the shell monomer, subsequently adding the initiator, and subsequently adding a simultaneous charge of the shell monomer and the second monomer.

21. The method of claim 1, wherein the core is polymerized through incremental addition, by multiple charges or metering, of simultaneous amounts of core monomer and crosslinking agent.

22. The method of claim 19 wherein the shell and interphase region are polymerized by adding the shell monomer, subsequently adding the initiator, and subsequently adding a simultaneous charge of the shell monomer and the second monomer.

23. The method of claim 19, wherein the core is polymerized through incremental addition, by multiple charges or metering, of simultaneous amounts of core monomer and crosslinking agent.

* * * * *